United States Patent
Katayama et al.

(10) Patent No.: US 6,892,003 B2
(45) Date of Patent: May 10, 2005

(54) VARIABLE DISPERSION COMPENSATOR AND OPTICAL TRANSMISSION SYSTEM

(75) Inventors: Makoto Katayama, Yokohama (JP); Toshiaki Okuno, Yokohama (JP); Masayuki Nishimura, Yokohama (JP); Tomomi Sano, Yokohama (JP); Masakazu Shigehara, Yokohama (JP); Hiroshi Suganuma, Yokohama (JP); Toru Iwashima, Yokohama (JP); Tomohiko Kanie, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 120 days.

(21) Appl. No.: 10/114,321

(22) Filed: Apr. 3, 2002

(65) Prior Publication Data

US 2002/0159701 A1 Oct. 31, 2002

Related U.S. Application Data

(60) Provisional application No. 60/280,743, filed on Apr. 13, 2001.

(30) Foreign Application Priority Data

Apr. 3, 2001 (JP) ........................................ 2001-105143
Jun. 13, 2001 (JP) ........................................ 2001-179088

(51) Int. Cl.[7] .......................... G02B 6/26; G02B 6/35; H04J 14/02
(52) U.S. Cl. .............................. 385/39; 385/18; 398/81
(58) Field of Search .............................................. 385/18

(56) References Cited

U.S. PATENT DOCUMENTS

| 5,608,562 A | 3/1997 | Delavaux et al. |
| 5,867,293 A | 2/1999 | Kotten |
| 6,441,959 B1 * | 8/2002 | Yang et al. ................. 359/495 |

(Continued)

FOREIGN PATENT DOCUMENTS

| EP | 0 607 782 A1 | 7/1994 |
| EP | 1 061 674 A2 | 12/2000 |

OTHER PUBLICATIONS

A. Hirano, et al, "Wide–Band WDW Transmission Experiment Using Dispersion Slope Compensator Based on Time–Space Conversion" Technical Report Of IEICE, The Institute Of Electronics, Information And Communication Engineers, 2000, p. 23–28.

(Continued)

*Primary Examiner*—Edward J. Glick
*Assistant Examiner*—Krystyna Suchecki
(74) *Attorney, Agent, or Firm*—McDermott Will & Emery LLP

(57) ABSTRACT

An optical signal, which is to become the subject of dispersion compensation, is split by optical combining/splitting unit 2, and each frequency component of the optical signal that is split is reflected by the corresponding reflective mirror 30 included in reflective mirror group 3 to apply a predetermined phase shift to the respective frequency components Each reflected frequency component is then combined using optical combining/splitting unit 2, to give dispersion compensated optical signal Furthermore, in regards to reflective mirror group 3, which is used to apply phase shift to each frequency component of an optical signal, each of the respective plurality of reflective mirrors 30 is made a movable mirror having a movable reflection position that reflects the frequency components. Through this, dispersion that develops in an optical signal may be compensated with favorable controllability and high accuracy. Therefore, the precision and controllability of dispersion compensation will become superior, and realized is a variable dispersion compensator having a miniaturized optical circuit, and an optical transmission system comprising such variable dispersion compensator, 13 Claims, 17 Drawing Sheets

U.S. PATENT DOCUMENTS

| | | | | |
|---|---|---|---|---|
| 6,539,143 | B1 | * | 3/2003 | Hunter .......................... 385/19 |
| 6,597,491 | B2 | * | 7/2003 | Islam et al. .................. 359/291 |
| 6,636,662 | B1 | * | 10/2003 | Thompson et al. ............ 385/27 |
| 6,776,493 | B1 | * | 8/2004 | Kuzma ....................... 359/615 |
| 2001/0028769 | A1 | | 10/2001 | Cao |
| 2003/0021523 | A1 | * | 1/2003 | De Natale ................... 385/18 |
| 2003/0021526 | A1 | * | 1/2003 | Bouevitch .................... 385/24 |

OTHER PUBLICATIONS

K. Takiguchi, "*Trend of Terabit Optical Communication System Technology*" Dispersion Compensation Technology, vol. 22, No. 9, pp. 1151–1159 (w/English Translation).

M. Shirasaki, et al, "*Variable Dispersion Compensator Using the Virtually Imaged Phased Array (VIPA) For 40–Gbits/s WDM Transmission Systems*".

* cited by examiner

VARIABLE DISPERSION COMPENSATOR AND OPTICAL TRANSMISSION SYSTEM

CROSS-REFERENCE TO RELATED APPLICATION

This application claims priority to Provisional Application Ser. No. 60/280,743 filed Apr. 3, 2001, which is hereby incorporated by reference in its entirety.

BACKGROUND OF THE INVENTION

1. Field of the Invention

The present invention relates to a variable dispersion compensator, which compensates for dispersion that develops in an optical signal due to its propagation through an optical transmission line such as an optical fiber transmission line, and an optical transmission system in which it is provided.

2. Description of the Related Art

In an optical transmission system in which optical signals are propagated by optical fiber transmission lines and the like, dispersion accumulates in optical components of each frequency (each wavelength) that is included in an optical signal through the dispersion that exists in an optical fiber, In this regard, it is desired that the amount of dispersion in an optical transmission system be reduced in the frequency band that includes optical signal frequencies in order to suppress waveform deterioration of an optical signal due to propagation along an optical transmission line. In addition, in wavelength division multiplexing (WDM) transmission systems, which propagate multi-wavelength optical signals, in the same manner, it is necessary to reduce the amount of dispersion in the frequency band that includes optical signal frequencies (optical signal wavelengths) of the respective multi-wavelength optical signals.

To compensate dispersion that accumulates in each frequency component of an optical signal, a dispersion compensator is provided upon an optical transmission line. With a dispersion compensator, the dispersion that develops in an optical signal is compensated by applying an appropriate phase shift to an optical signal. Such an optical compensator is disclosed in, for example, Document 1 [The Journal of the Institute of Electronics, Information and Communication Engineers (Shingaku Gihou) Vol. 100, No. 379, OCS2000-61], Document 2 [O plus E Vol. 22, No. 9, p. 1151], and Document 3 [OFC2000, Shirasaki, et al., Variable Dispersion Compensator Using The Virtually Imaged Phased Array (VIPA) for 40-Gbit/s WDM Transmission Systems].

SUMMARY OF THE INVENTION

In recent years, due to the expansion of optical transmission systems, dispersion compensation with even higher accuracy is possible in dispersion compensators configured upon optical transmission lines, and there are also demands for dispersion compensators with superior controllability of dispersion compensation. In this regard, sufficient controllability and accuracy of dispersion compensation cannot be obtained with conventional dispersion compensators.

For example, the dispersion compensator disclosed in the above-mentioned Document 1 is configured comprising arrayed-waveguide grating (AWG). Phase adjustment is performed by the spatial phase filter for each frequency component of an optical signal that is input from the first slab waveguide side of the AWG, and output from the second slab waveguide on the opposite side to compensate the dispersion of an optical signal. However, with such configuration, since a spatial phase filter is used for phase adjustment of each frequency component of the optical signal, the applied phase shift is fixed so that dispersion compensation cannot be adjusted.

Furthermore, the dispersion compensator disclosed in Document 2 is configured so as to use a planar waveguide type optical circuit with a variable optical path difference with a Mach Zender interferometer (MZI) to perform dispersion compensation. However, with such configuration, the structure of the optical circuit becomes complex, and its size also becomes large (e.g., approximately 5 cm$^2$). In addition, the response of phase adjustment is low (e.g., approximately 10 ms).

Furthermore, with the dispersion compensator disclosed in Document 3, a device that propagates an optical signal through space is used to change optical path length; however, with such configuration, the system is large, and highly accurate phase adjustment is difficult. In addition, the insertion loss into the optical fiber transmission line is large, for instance, 10 dB or greater.

The present invention has come about in order to solve the problems mentioned above, and aims to provide a variable dispersion compensator, and an optical transmission system equipped therewith, which have superior controllability and accuracy of dispersion compensation while also allowing size reduction of that optical circuit.

In order to achieve such an objective, the variable dispersion compensator according to the present invention is a variable dispersion compensator, which applies a phase shift to an optical signal to compensate dispersion in the optical signal, and is characterized by comprising (1) optical splitting means, which inputs an optical signal that is to become the subject of dispersion compensation, and splits the optical signal for every frequency component within a predetermined frequency band; (2) reflecting means, which reflects each of the respective frequency components that are split by the optical splitting means to apply a predetermined phase shift to each frequency component, and is configured with the reflection position for each of the respective frequency components being movable in the direction of optical signal propagation; and (3) optical combining means, which combines the frequency components reflected by the reflecting means to give a dispersion compensated optical signal.

In the variable dispersion compensator mentioned above, the difference in optical path length from an optical splitting means, through a reflecting means, until an optical combining means is used to apply a predetermined phase shift to each frequency component of an optical signal. Then through the use of the reflecting means having a movable reflection position for each frequency component, the phase shift applied to each frequency component is made variable.

With such configuration, it is possible to compensate dispersion that develops in an optical signal with high accuracy. Furthermore, by adjusting the reflection position at the reflecting means relative to each frequency component, it is possible to control the dispersion compensation due to application of a phase shift. Furthermore, since dispersion compensation is controlled with only the reflecting means, it is possible to simplify the structure of the optical circuit, and accordingly, allow for the size reduction of the optical circuit.

In addition, an optical transmission system according to the present invention is characterized by comprising (a) an optical transmission line, which propagates an optical signal having a frequency component within a predetermined frequency band; and (b) the variable dispersion compensator mentioned above, which is disposed at a predetermined position upon the optical transmission line and compensates dispersion that develops in the optical signal propagated through the optical transmission line.

Through this, dispersion that develops in an optical signal that propagates through an optical transmission line such as an optical fiber transmission line may be compensated with favorable controllability and high accuracy to achieve an optical transmission system that prevents waveform deterioration of an optical signal The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, the preferred embodiments of a variable dispersion compensator and optical transmission system according to the present invention, together with drawings, are described in detail. It is noted here that in the description of drawings the same elements are given the same reference markers, and repetitive descriptions are omitted. In addition, the measurement scale of the drawings does not always match that of the description.

Figure 1:
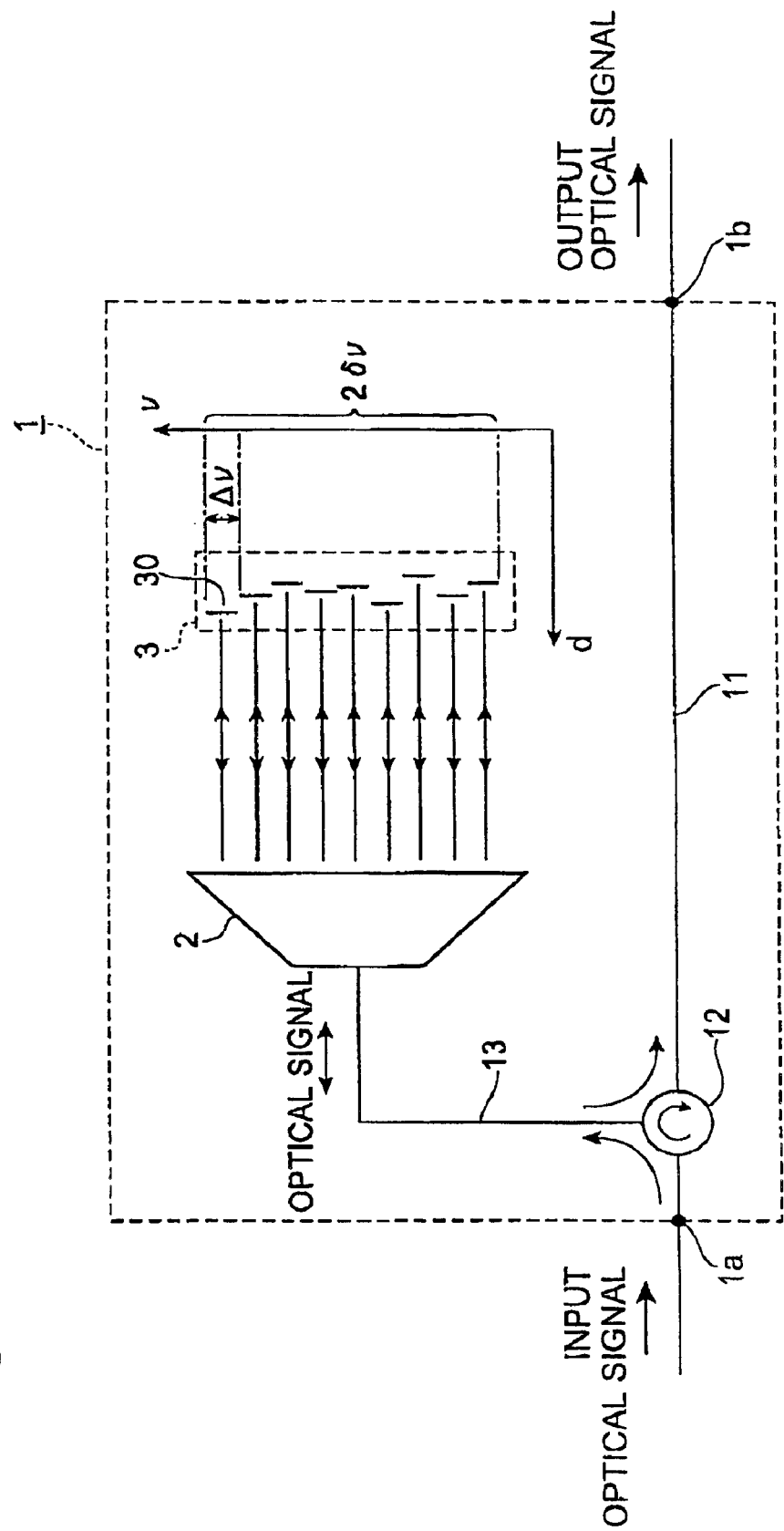
FIG. 1 is a block diagram that illustratively shows the one of the embodiments of a variable dispersion compensator.

To begin with, the schematic of a variable dispersion compensator is described. FIG. 1 is a block diagram that illustratively shows the one of the embodiments of a variable dispersion compensator according to the present invention. Variable dispersion compensator 1 of this embodiment applies a predetermined amount of phase shift to an input optical signal to compensate the dispersion of the optical signal, and is configured comprising optical combining/splitting unit 2 and reflective mirror group 3. In addition, regarding the dispersion compensation functionality, the amount of phase shift that is applied to each frequency component of the optical signal for dispersion compensation is variable.

An optical signal, which is to become the subject of dispersion compensation and which has a frequency component (wavelength component) within a predetermined frequency band (wavelength band), is input from input terminal 1a of variable dispersion compensator 1, and after a predetermined phase shift is applied, is output as a dispersion compensated optical signal from output terminal 1b. Between input terminal 1a and output terminal 1b, there is provided optical transmission line 11 through which an optical signal is propagated.

Optical circulator 12 is provided at a predetermined position upon optical transmission line 11. In addition, optical transmission line 13, which is used for dispersion compensation, is connected to optical circulator 12. Through this, the pre-dispersion compensation optical signal from the input terminal 1a side of optical transmission line 11 passes through optical circulator 12 to be output towards optical transmission line 13. In addition, the post-dispersion compensation optical signal from optical transmission line 13 passes through optical circulator 12 to be output towards the output terminal 1b side of optical transmission line 11.

The aforementioned optical combining/splitting unit 2 and reflective mirror group 3, in such order, are disposed at the end of the side opposite optical circulator 12 of dispersion compensation optical transmission line 13. In accordance with this optical combining/splitting unit 2 and this reflective mirror group 3, phase shift is applied to an optical signal to compensate the dispersion thereof.

Optical combining/splitting unit 2 is a single optical combining/splitting means, which functions as an optical splitting means that inputs the pre-dispersion compensation optical signal and splits every frequency component of the optical signal within a predetermined frequency band, and functions as an optical combining means that combines each frequency component of the optical signal to give the post-dispersion compensation optical signal. The optical signal that is to become the subject of dispersion compensation, in this optical combining/splitting unit 2, is split or combined by frequency ν (or wavelength λ) along a predetermined splitting direction (direction of the ν-axis in FIG. 1).

In addition, reflective mirror group 3 is a reflecting means that reflects the respective frequency components of the optical signal that is split by optical combining/splitting unit 2 to apply a predetermined phase shift to each frequency component. Phase shift is applied to each frequency component of the optical signal using the optical path length and optical path length differences from optical combining/splitting unit 2 (optical splitting means) through reflective mirror group 3 (reflecting means) until again reaching optical combining/splitting unit 2 (optical combining means). In addition, this reflective mirror group 3 is configured to be variable in terms of the reflecting point for the respective frequency components along the direction of optical signal propagation (direction of the d-axis shown in FIG. 1).

Reflective mirror group 3, which is a reflecting means in this embodiment, comprises a plurality of reflective mirrors 30, which are divided for every frequency corresponding to each frequency component of the optical signal that is split by optical combining/splitting unit 2. These reflective mirrors 30 are arrayed nearly continuously having the direction of the ν-axis, which is the direction of the splitting of optical signal and approximately perpendicular to the direction of optical signal propagation, as the direction of arrayal; and in accordance with this, reflective mirror group 3, which reflects the respective frequency components of the optical signal within the entire frequency band that is to be subjected to dispersion compensation, is formed.

In addition, each respective reflective mirror 30 that configures reflective mirror group 3 has a fixed shape of reflective surface; however, each is made as a movable mirror allowing movement relative to the direction of the d-axis, which is the direction of optical signal propagation, separate and independent of each other.

In the above configuration, the optical signal, which is the subject of dispersion compensation and input to variable dispersion compensator 1 from input terminal 1a, is input to optical combining/splitting unit 2 through optical transmission line 11, optical circulator 12, and optical transmission line 13; and each frequency component is split off according to such frequency ν. Each frequency component of the optical signal that has been split is propagated towards reflective mirror group 3, and is reflected at a predetermined reflection position by corresponding reflective mirror 30 of reflective mirror group 3. Each frequency component that has been reflected is then combined again by optical combining/splitting unit 2 to become a post-dispersion compensation optical signal, and is output to an external portion from output terminal 1b through optical transmission line 13, optical circulator 12, and optical transmission line 11.

Here, the reflection position of a frequency component of the optical signal for each reflective mirror 30 of reflective mirror group 3 is determined based on the amount of phase shift that should be applied to that frequency component. The drive of each respective reflective mirror 30, which is a movable mirror, is controlled so as to move it in the direction of optical signal propagation and into the set reflection position; as a result, dispersion compensation of the optical signal is achieved within the entire frequency band.

Figure 2:
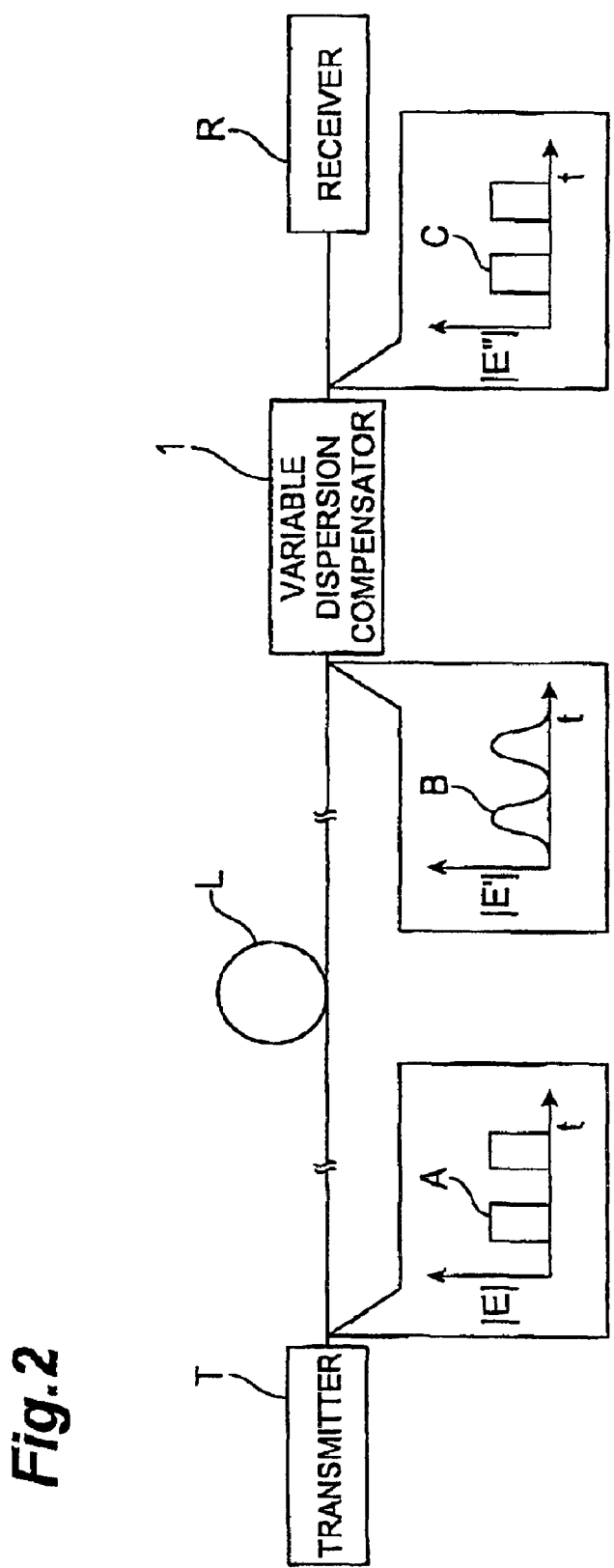
FIG. 2 is a block diagram that illustratively shows the one of the embodiments of an optical transmission system.

Next, the optical transmission system comprising the variable dispersion compensator mentioned above is described. FIG. 2 is a block diagram that illustratively shows the one of the embodiments of an optical transmission system according to the present intention.

The optical transmission system of this embodiment is configured comprising transmitter (transmitting station) T, which transmits an optical signal; optical fiber transmission line L, which is an optical transmission line that propagates the optical signal that is transmitted from transmitter T; and receiver (receiving station) R, which receives the optical signal that is propagated through optical fiber transmission line L.

Variable dispersion compensator 1, which has the configuration shown in FIG. 1 is disposed at a predetermined position upon optical fiber transmission line L. This variable dispersion compensator 1 is preferably provided at a position upon optical fiber transmission line L that is near receiver R, for instance, at a position that is immediately before receiver R. Through this, dispersion compensation can be performed for the dispersion that has accumulated in the optical signal propagating from transmitter T towards receiver R through optical fiber transmission line L using variable dispersion compensator 1 before the optical signal is received by receiver R.

In the variable dispersion compensator and optical transmission system according to this embodiment, where the optical signal that is split by the optical splitting means, optical combining/splitting unit 2, travels until it is combined again by the optical combining means, optical combining/splitting unit 2, is used to apply phase shift to each frequency component of the optical signal Then as for reflective mirror group 3, which is the reflecting means and which is used for setting the optical path length and phase shift for each frequency component, the reflection position of the frequency component with respect to reflective mirrors 30, which configure reflective mirror group 3, is made variable by the respective reflective mirrors 30.

Through this, since the phase shift that is applied to each frequency component is variable, it becomes possible to perform discretionary phase adjustment, and makes it possible to compensate the dispersion that develops in an optical signal with high accuracy. Furthermore, since the separate adjustment of the frequency component reflection position, with respect to each of the respective reflective mirrors 30 that configure reflective mirror group 3, is allowed, the amount of phase shift that is applied to the optical signal can be controlled with favorable controllability, thereby making it possible to set or change the details of the conditions of dispersion compensation.

Moreover, since the control of dispersion compensation is performed only with the reflecting means, it is possible to simplify the structure of the optical circuit and allow for the size reduction of the optical circuit. It is noted here that such a reflecting means may be manufactured using, for instance, Micro Electro Mechanical System (MEMS) technology.

With an optical transmission system that applies a variable dispersion compensator having such structure, dispersion that develops in optical signal that propagates through an optical transmission line such as optical fiber transmission line L may be compensated having favorable controllability and high accuracy to achieve an optical transmission system that reliably prevents waveform deterioration of an optical signal.

It is noted here that with variable dispersion compensator 1 shown in FIG. 1, single optical combining/splitting unit 2 is used as optical splitting means for splitting a pre-dispersion compensation optical signal into frequency components, and as optical combining means for combining frequency components to give a post-dispersion compensation optical signal. Accordingly, the structure of variable dispersion compensator 1 is simplified to allow the further size reduction of such optical circuit. However, such optical splitting means and optical combining means may even be configured separately.

Figure 3:
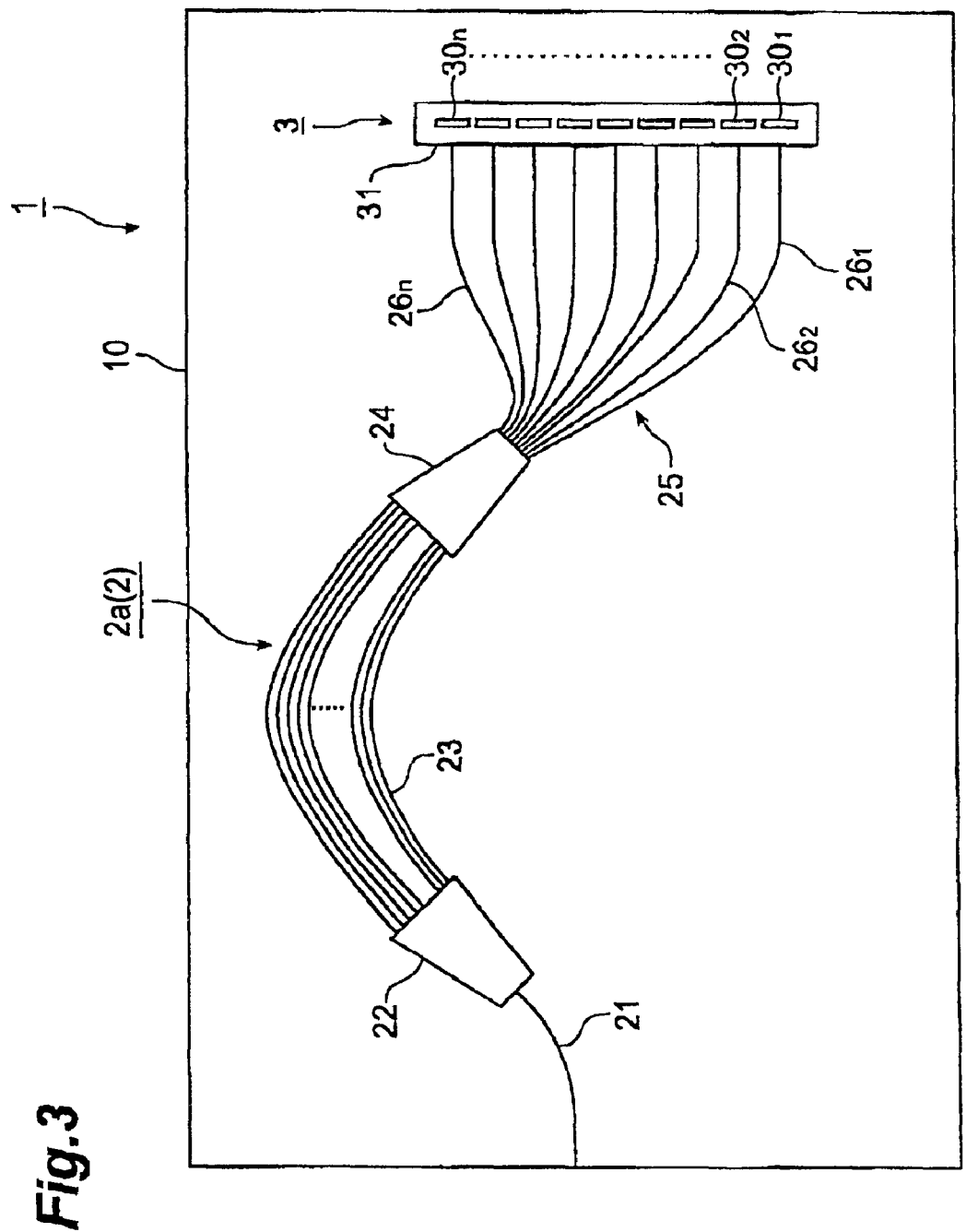
FIG. 3 is a planar view showing a more specific structural example of a variable dispersion compensator according to the embodiment shown in FIGS.1.

FIG. 3 is a planar view showing a more specific structural example of the variable dispersion compensator according to this embodiment that is shown in FIG. 1. It is noted here that in FIG. 3, optical transmission line 11 and optical circulator 12, etc. are not shown, but only the optical circuit comprising optical combining/splitting unit 2 and reflective mirror group 3, which actually perform dispersion compensation of an optical signal, is shown.

In variable dispersion compensator 1 of this example, arrayed waveguide grating (AWG) 2a with a planar waveguide type optical circuit that is formed in a predetermined waveguide pattern upon substrate 10 is used as optical combining/splitting unit 2, which splits and alternately combines an optical signal that is to become the subject of dispersion compensation.

AWG 2a is configured including input/output channel waveguide 21, the end thereof being made into an input/output port; first slab waveguide 22, which is connected to input/output channel waveguide 21; array waveguide portion 23, which comprises a plurality of channel waveguides that are connected to first slab waveguide 22 with each differing in optical path length from the others; and second slab waveguide 24, which is connected to array waveguide portion 23.

To the side opposite array waveguide portion 23 of second slab waveguide 24, there is further connected channel waveguide group 25, which comprises a plurality of lines (n lines) of channel waveguides $26_I$ to $26_n$. In addition, on the side opposite second slab waveguide 24 of channel waveguide group 25, there is provided reflective mirror group 3, which comprises n movable reflective mirrors $30_1$, $30_2$, ..., $30_n$ corresponding to each of the respective n lines of channel waveguides $26_1$, $26_2$, ..., $26_n$. These reflective mirrors $30_I$ to $30_n$ are disposed within trench portion 31, which is formed across channel waveguide group 25 upon substrate 10, so as to reflect the respective optical signal components that are propagated coming through the corresponding channel waveguides $26_I$ to $26_n$.

More specifically, trench portion 31 is formed along the direction that is made into the splitting direction of the optical signal, perpendicular to direction of optical signal propagation through channel waveguides $26_1$ to $26_n$ of channel waveguide group 25 (see FIG. 1). Reflective mirrors $30_I$ to $30_n$ of reflective mirror group 3 are then disposed in positions facing each respective corresponding channel waveguide $26_I$ to $26_n$ (positions facing the core of the channel waveguide) in the trench portion 31.

In the above configuration, when an optical signal is input to input/output channel waveguide 21 from the input/output port of AWG 2a, the optical signal is split into every frequency (every wavelength) while being guided through first slab waveguide 22, array waveguide portion 23, and second slab waveguide 24, in that order. Each frequency component of the optical signal that has been split is divided and input to the respective channel waveguides $26_I$ to $26_n$ of channel waveguide group 25.

The respective frequency components that are propagated through channel waveguides $26_I$ to $26_n$, are reflected by corresponding movable reflective mirror $30_1$ to $30_n$ of reflective mirror group 3, and are again propagated in the opposite direction through respective channel waveguides $26_I$ to $26_n$. Each frequency component is then combined while being guided through second slab waveguide 24, array waveguide portion 23, and first slab waveguide 22, in that order, outputting the dispersion compensated optical signal from the input/output port through input/output channel waveguide 21.

Here, reflective mirror group 3, which is the reflective means in this embodiment, is configured by a plurality of movable reflective mirrors 30, the reflective surface thereof capable of being moved separately, as described above. As a method of driving these movable reflective mirrors 30, it is preferable that the electrostatic force that develops due to the application of voltage between an electrode (first electrode) that is provided on movable mirror 30 and an electrode (second electrode) that is provided at a predetermined position relative to the first electrode be used to perform such drive control. Through this, the control of the reflection position at the reflective mirror, and the amount of phase shift and conditions of dispersion compensation set thereby, can be performed easily and at high speeds.

Figure 4:
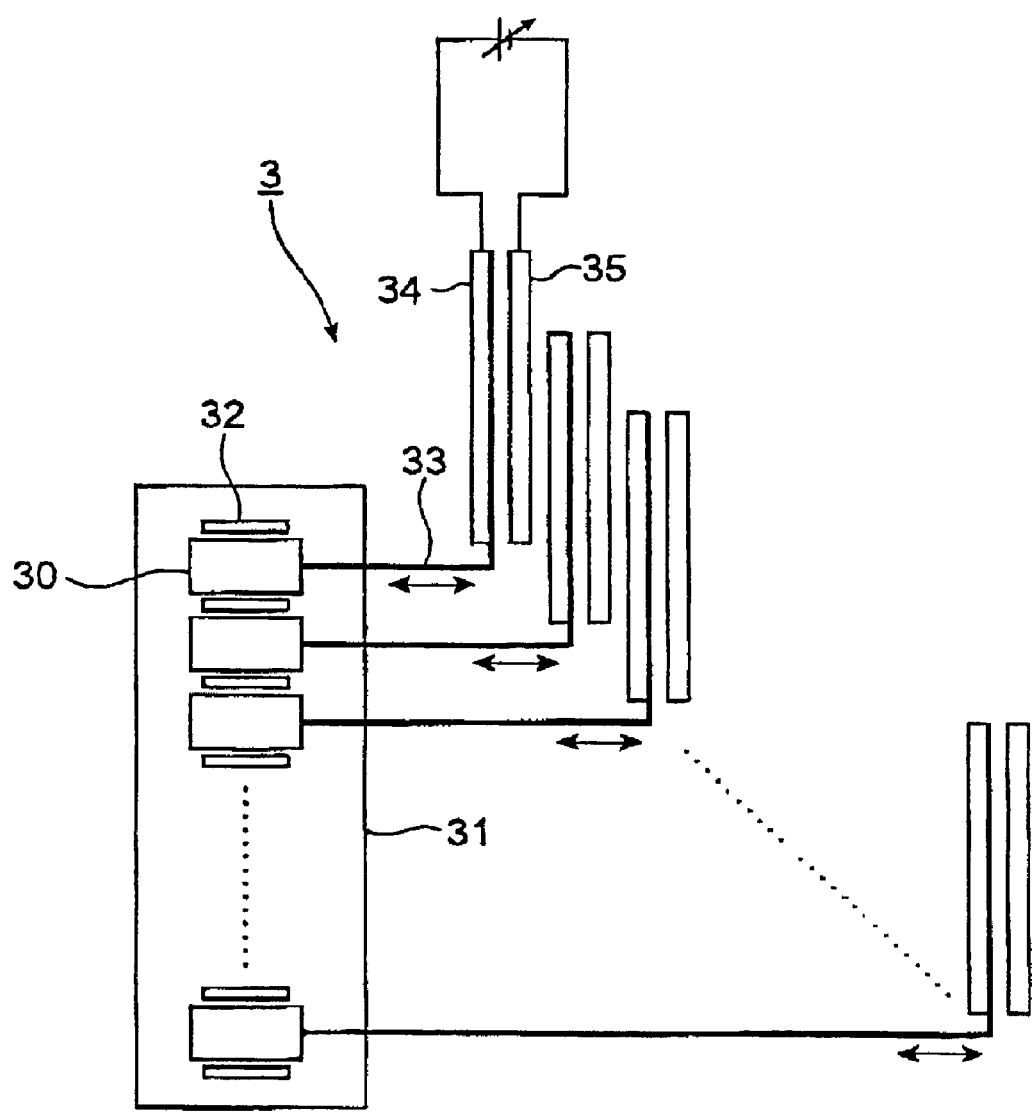
FIG. 4 is a block diagram of an example of a movable reflective mirror.

FIG. 4 is a block diagram showing an example of the movable reflective mirrors that is used as the reflective mirror group in the variable dispersion compensator shown in FIG. 3. This reflective mirror group 3 has a plurality of movable reflective mirrors 30, which are arrayed within trench portion 31 as described above. In addition, respective guide rails 32 are provided between neighboring movable reflective mirrors 30 to guide the shift direction of movable reflective mirrors 30.

Each respective movable reflective mirror 30 is supported by mirror support section 33, which preferably comprises an insulating material. Mirror support section 33 is made movable with the end opposite reflective mirrors 30 as a point of support, and electrode 34, which is the first electrode, formed on one side. In addition, electrode 35, which is the second electrode, is provided on the side opposite electrode 34, with mirror support section 33 in between them. This electrode 35 is fixed relative to substrate 10.

An adjustable electric power source, which adjustably applies voltage, is connected between electrode 34, which is provided on mirror support section 33, and electrode 35, which is fixed on substrate 10. If the applied voltage between this electrode 34 and electrode 35 changes, then a deflection develops at mirror support section 33 due to the electrostatic force that develops or the change therein, and movable reflective mirror 30 moves to this deflection in order to be shifted in the shift direction that is guided by guide rail 32.

Figure 5:
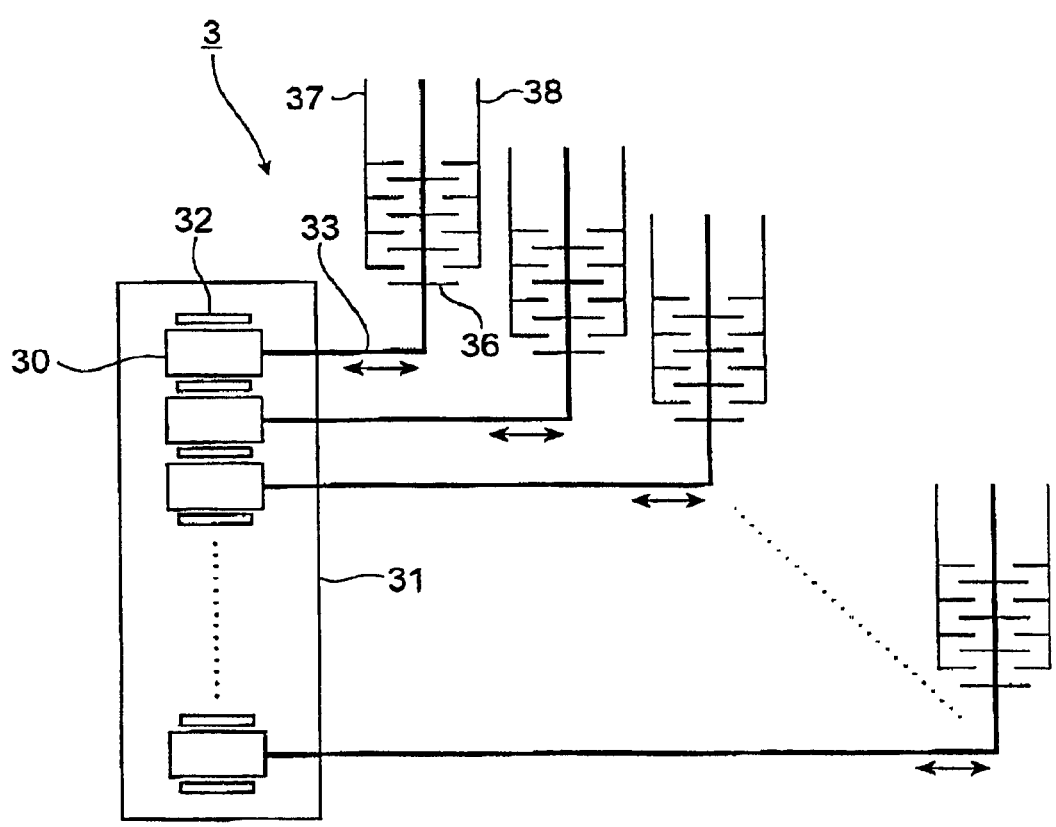
FIG. 5 is a block diagram of another example of a movable reflective mirror.

FIG. 5 is a block diagram showing another example of a movable reflective mirror. This reflective mirror group 3 is similar to the structural examples in FIG. 4 in regards to movable reflective mirror 30 being arrayed within trench portion 31, guide rail 32, and mirror support section 33; however, differs in the structure of the electrodes for driving reflective mirror 30.

Comb-shaped electrodes 36 are formed on both sides of mirror support section 33. Opposite these, similar comb-shaped electrodes 37 and 38 are provided on both sides of mirror support section 33. By changing the respective voltage applied to these comb-shaped electrodes 36, 37, and 38, movable reflective mirror 30 is shifted. In such cases where comb-shaped electrodes are used, reflective mirror 30 is allowed to be effectively driven with favorable accuracy.

The dispersion that develops in an optical signal in an optical transmission system, and dispersion compensation using a variable dispersion compensator are further described while referencing FIG. 1 and FIG 2. It is noted that in the following, optical intensity of an optical signal that is the subject of dispersion compensation is assumed as given by the value of amplitude |E| of that electric field, or the value of the square thereof.

An optical signal that is propagated through optical fiber transmission line L in an optical transmission system, as shown in FIG. 2, is generated in transmitter T so that optical intensity |E| has a predetermined signal waveform A, and transmitted as an input optical signal to the optical transmission system. This input optical signal has optical signal components that are spread out across a predetermined optical signal frequency band (wavelength band) with optical signal frequency $v_0$ (optical signal wavelength $\lambda_0 = c/v_0$) as the median frequency.

When such an optical signal is propagated through optical fiber transmission line L, the dispersion of optical fiber transmission line L accumulates in the optical signal. The propagated optical signal then, as shown by signal waveforms in FIG. 2, develops waveform deterioration, where the signal waveform of optical intensity |E'| is distorted from signal waveform A of the input optical signal.

In variable dispersion compensator 1, phase shift, which is used to compensate the dispersion of each frequency component of optical signal, is applied to each frequency component of an optical signal that is the subject of dispersion compensation and in which such waveform deterioration has developed, so as to negate the phase shift from dispersion that has accumulated in optical fiber transmission line L in order to compensate the dispersion. Through this, an optical signal is obtained having signal waveform C of optical intensity |E''|, which has removed to the greatest extent possible the effects of dispersion due to being propagated through optical fiber transmission line L.

In more detail, in cases where there exists second order dispersion (dispersion) $D^{(2)}$ and third order dispersion (dispersion slope) $D^{(3)}$ in optical fiber transmission line L, the value of total dispersion D for the optical signal components of wavelength $\lambda$ (=c/v) is given by the following expression, wherein group delay time is assumed as $\tau$ and $\lambda_0$ is the median wavelength of the above-mentioned optical signal.

$$D(\lambda)=d\tau/d\lambda=D^{(2)}+D^{(3)}(\lambda-\lambda_0)$$

When second order dispersion $D^{(2)}$ is made dominant in the total dispersion D, the group delay time $\tau$ for the optical signal component of wavelength $\lambda$ becomes $$\tau(\lambda)=D^{(2)}(\lambda-\lambda_0).$$

At this point, phase shift $\phi$ due to dispersion that develops in each optical signal component of the optical signal that has propagated through optical fiber transmission line L, when the phase shift at median frequency $v_0$ (median wavelength $\lambda_0$) is given as 0, becomes the following.

$$\phi=-\pi c D^{(2)}((v-v_0)/v_0)^2$$

or when the rate of change of phase shift $\phi$ is $$d\phi/dv=-(2\pi c D^{(2)}/v_0^2)\times(v-v_0).$$

In other words, phase shift that has parabolic change with a center of median frequency $v_0$ develops in an optical signal that propagates through optical fiber transmission line L due to dispersion $D^{(2)}$.

Dispersion compensation is performed using variable dispersion compensator 1, which is shown in FIG. 1 and FIG. 3, for an optical signal in which such phase shift develops. Here as shown in FIG. 1, the total width of the frequency band in the entire reflective mirror group 3 that is to become the frequency band in which dispersion compensation is performed is given as $2\delta v$, and the dispersion compensation resolution, which is the respective frequency width of the plurality of reflective mirrors 30 that are included in reflective mirror group 3, is given as $\Delta v$.

Furthermore, in regards to each of the respective reflective mirrors $30_1$ to $30_n$ included in reflective mirror group 3, the median frequency of the frequency component of the optical signal that is reflected by reflective mirror $30_1$ is given as $v_i$, and the phase shift that is applied for dispersion compensation in each frequency component of the optical signal is given as $\psi$.

The reflection position of each frequency component in accordance with each respective reflective mirror $30_1$ to $30_n$ is set so that phase shift $\phi$ in optical fiber transmission line L at median frequency $v_i$ of reflective mirror $30_i$ is negated by making the phase shift applied to a frequency component of the optical signal due to the reflection at reflective mirror $30_i$ become $\psi=-\phi(v_i)$.

Once the reflection position for each of the respective reflective mirrors 30 is set, each movable reflective mirror 30 is shifted to have the reflection position that is set. Through this, a configuration that is capable of compensating dispersion in an optical transmission system is realized. Position d (see FIG. 1) of movable reflective mirror $30_i$, which applies phase shift $\psi=-\phi(v_i)$ can be found with the following expression, wherein the refractive index of the medium between optical combining/splitting unit 2 and reflective mirror group 3 is given as n, $$d=c\phi(v_i)/4\pi n v_i.$$

Here, as in the aforementioned examples, in the case where reflective mirror group 3, which is reflecting means, is configured from a plurality of divided reflective mirrors 30, within the range of each reflective mirror 30, the amount of phase shift $\psi$ that is applied to the frequency component of an optical signal becomes constant. Accordingly, in order to effectively perform dispersion compensation of an optical signal, it is preferable that the dispersion compensation frequency resolution $\Delta v$ of dispersion compensation in reflective mirror group 3 be set so that phase shift $\phi(v)$, which develops in optical signal, does not change drastically within the frequency range $\Delta v$ that corresponds to one reflective mirror 30. More specifically, it is preferable that the frequency resolution $\Delta v$ meet the conditions of the following expression relative to the rate of change d $\phi/dv$ of phase shift $\phi$.

$$|\Delta v\times(d\phi/dv)|\leq\pi$$

When second order dispersion $D^{(2)}$ is dominant in the total dispersion D, the absolute value of the rate of change $|(d\phi/dv)|$ of phase shift $\phi$ is maximized at the frequency components at the extremities of the frequency band, which are separated by frequency $v=v_0\pm\delta v$, namely by frequency $\delta v$ which is half of the total width $2\delta v$ from median frequency $v_0$, with that maximized value being $$|d\phi/dv|_{max}=|2\pi cD^{(2)}\delta v/v_0^2|.$$

Accordingly, the maximized value of dispersion $D^{(2)}$ that meets the above preferred conditions of $$|\Delta v \times (d\phi/dv)| \leq \pi$$

becomes $$|D^{(2)}|_{max}=v_0^2/2c\Delta v\delta v.$$

For example, in regards to the optical signal that becomes the subject of dispersion compensation, if that median frequency is given as $v_0=189.1$ THz (median wavelength given as $\lambda_0=1585$ nm), the half-width of the frequency band as $\delta v=50$ GHz, and the frequency resolution as $\Delta v=5$ GHz, which is the frequency range for one reflective mirror, then it follows that the maximum dispersion capable of being compensated is $|D^{(2)}|_{max}=240$ ps/nm. In addition, with similar conditions, if the half-width of the frequency band is given as $\delta v=15$ GHz, and the frequency resolution as $\Delta v=3$ GHz, then it follows that the maximum dispersion capable of being compensated is $|D^{(2)}|_{max}=1300$ ps/nm.

It is noted that using the above expressions, the value of the maximum dispersion capable of being compensated $|D^{(2)}|_{max}$ becomes larger as the frequency resolution $\Delta v$ becomes finer. In regards to this frequency resolution $\Delta v$, it is preferable that it be set to a favorable value in consideration of structure of the variable dispersion compensator, for example, the splitting conditions of the optical signal due to AWG $2a$ in variable dispersion compensator 1, which is shown in FIG. 3, and the width with which the divided movable reflective mirrors upon substrate 10 are capable of being formed.

Here, a more specific structural example of variable dispersion compensator 1 that is shown in FIG. 3 including AWG $2a$ is illustrated. If the interval between neighboring channel waveguides of channel waveguide group 25 that is connected to second slab waveguide 24 is given as $\Delta x$, and the wavelength interval between the frequency components of the optical signal propagated through neighboring channel waveguides as $\Delta \lambda$, then the following expression is obtained.

$$\Delta x/\Delta \lambda = N_c f\Delta L/n_0\Delta x\lambda_0,$$

wherein $N_c$ is the group refractive index of the waveguide, f is the length of the slab waveguides along their length, $\Delta L$ is the optical path length difference of the channel waveguides in the array waveguide portion, and $n_s$ is the effective refractive index of the slab waveguides. Of these the group refractive index $N_c$ and effective refractive index $n_s$ are in the range of 1.5, respectively.

In this regard, if the median wavelength of the optical signal is given as $\lambda_0=1550$ nm and the frequency band in which dispersion compensation is performed is $2\delta v=100$ GHz (which correlates to wavelength band 0.8 nm), then the frequency resolution of this frequency band being divided into 10 parts becomes $\Delta v=10$ GHz. Accordingly, the wavelength resolution is $\Delta \lambda=0.08$ nm. Furthermore, the interval between channel waveguides becomes $\Delta x=20$ μm.

If these numeric values are substituted, then as a structural condition that should be met for AWG $2a$ of variable dispersion compensator 1, it is found that $$f\Delta L=7.75\times 10^{-6} \text{ m}.$$

It is possible to meet this condition if with a structure, for example, where the slab waveguide is set with f=30 mm, and the array waveguide portion is set with $\Delta L=258$ μm.

It is noted that it is preferable that dispersion compensation frequency band $2\delta v$ be set so that it sufficiently includes a frequency range throughout which the optical signal component of the optical signal that is to become the subject of dispersion compensation is distributed.

Furthermore, if the optical signal that is to become the subject of dispersion compensation is a multi-wavelength optical signal comprising a plurality of optical signals having optical signal wavelengths differing from each other, then in cases where dispersion compensation is performed for a single optical signal included in the multi-wavelength optical signal, it is possible for the frequency interval between neighboring optical signals to be total frequency width $2\delta v$. Furthermore, when the total frequency width $2\delta v$ is made larger than the frequency interval between neighboring optical signals (e.g. in integral multiples), the structure becomes capable of dispersion compensating the plurality of optical signals included a multi-wavelength optical signal.

Furthermore, in regards to the bit rate (modulation rate) of the optical signal, it is preferable that the bit rate be 10 Gbps or faster, and even more preferably, 40 Gbps or faster. The development of dispersion in the optical transmission line becomes particularly problematic with such high-speed bit rates; however, even in such cases, by adopting the configuration described above in a variable dispersion compensator, favorable dispersion compensation of the optical signal can be performed with sufficient accuracy. However, needless to say, variable dispersion compensator 1 may be effectively adopted for optical signals with bit rates that are lower than those mentioned above.

Furthermore, it is preferable that the array of the reflective mirrors that comprise the reflecting means or the shape of the reflecting surface be somewhat parabolic in relation to the frequency component to be reflected. Through this, in cases where second order dispersion $D^{(2)}$ becomes dominant in the dispersion that develops in the optical transmission line, it is possible to achieve favorable dispersion compensation for an optical signal throughout the entire frequency band that becomes the subject of dispersion compensation.

Simulations were performed by applying the specific conditions in the optical transmission system and variable dispersion compensator having the configuration mentioned above, and the results were confirmed with regard to dispersion compensation of the optical signal and waveform deterioration of the optical signal due to dispersion in the optical transmission line.

As for the optical signal that was to become the subject of dispersion compensation, the median frequency was set at $v_0=189.1$ THz (median wavelength of $\lambda_0=1585$ nm), in addition, the modulation scheme was set to NRZ, and modulation rate (bit rate) M set to either 10 Gbps or 40 Gbps. In addition, the waveform of the optical pulse of the optical signal was set to be a super-Gaussian, non-chirp form. Here, if the duration of the one-bit signal is given as $2t_0$ (=1/M), then the signal waveform of the optical signal is applied as $$E(t)=\exp\{-\log 2/2\times(t/t_0)^{2m}\},$$

wherein m is given as the parameter that determines the optical pulse form and here it is set to m=2.

Furthermore, random codes of $2^9$=512 bits were transmitted as the optical signal to actually be subjected to dispersion compensation, and the obtained signal waveform was estimated through the eye pattern displayed.

To begin with, an example of dispersion compensation in the case where the bit rate was made to be M=10 Gbps is illustrated. With this 10 Gbps bit rate, the clock for the signal period is 100 ps.

Figure 6A:
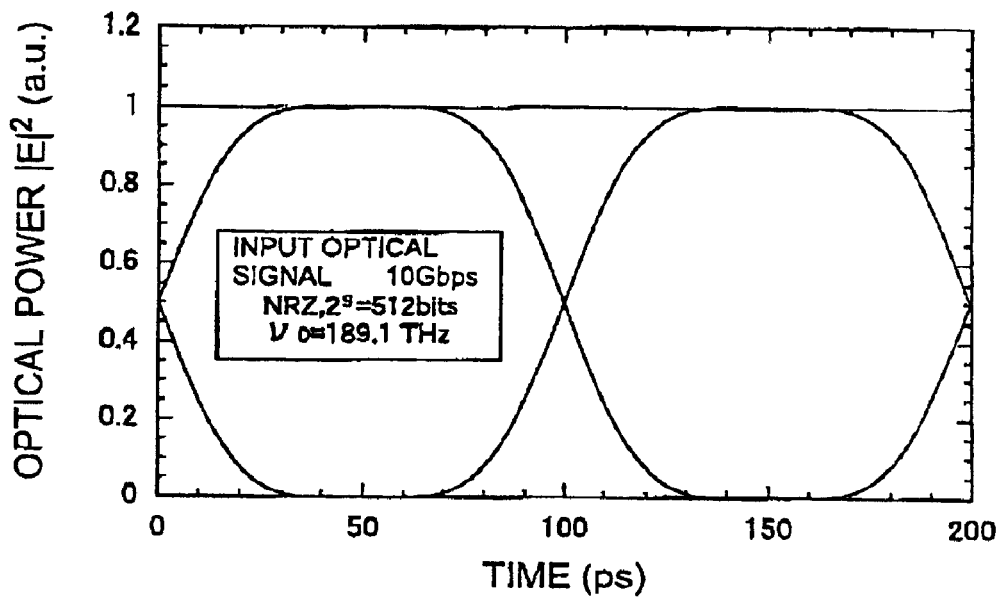
FIGS. 6A and 6B are graphs of an example of (A) the input optical signal, and (B) the pre-dispersion compensation output optical signal in a 10 Gbps optical transmission system.
Figure 6B:
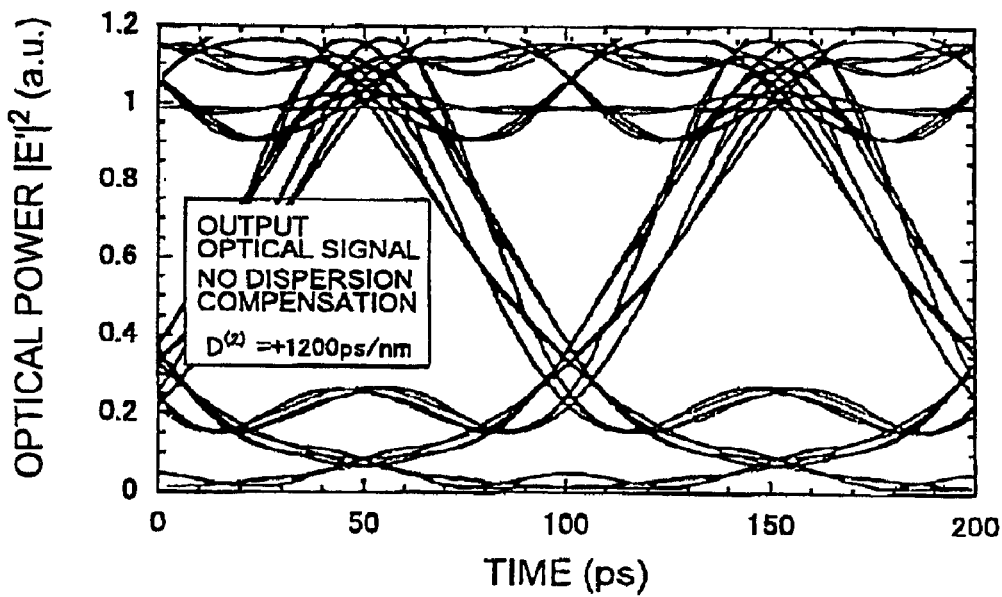

FIGS. 6A and 6B are graphs illustrating an example of the optical signal that the 10 Gbps optical transmission system transmits, wherein FIG. 6A illustrates the signal waveform of the input optical signal immediately after the transmitter (refer to signal waveform A in FIG. 2); and FIG. 6B illustrates the signal waveform of the output optical signal before dispersion compensation (without dispersion compensation) (refer to signal waveform B in FIG. 2).

The input optical signal having the signal waveform shown in FIG. 6A has frequency components in a frequency range of approximately ±15 GHz, with optical signal frequency $v_0$=189.1 THz as the median In this regard, when the dispersion that develops in the optical signal due to propagation in the optical transmission line is set as $D^{(2)}$=+1200 ps/nm, $D^{(3)}$=0 ps/nm$^2$, the signal waveform in the post-propagation output optical signal becomes a waveform with developed waveform deterioration due to dispersion, as shown in FIG. 6B.

Figure 7A:
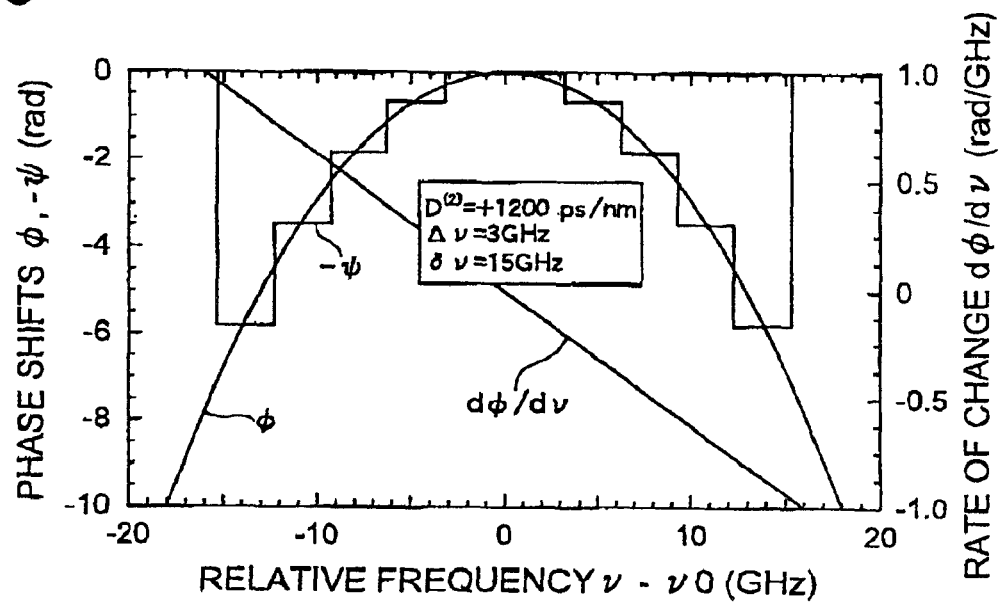
FIGS. 7A and 7B are graphs of an example of (A) the phase shift of an optical signal, and (B) the post-dispersion compensation output optical signal in a 10 Gbps optical transmission system.
Figure 7B:
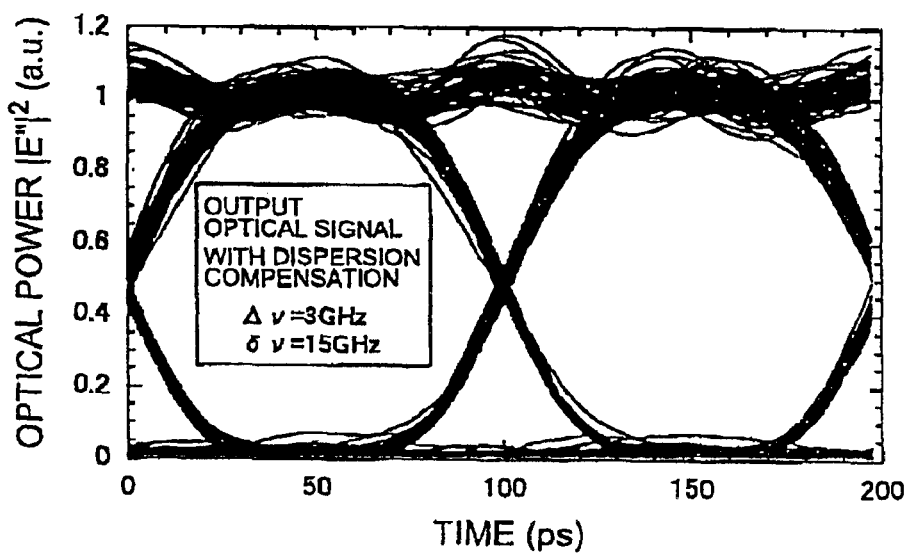

FIGS. 7A and 7B are graphs showing an example of dispersion compensation for an optical signal that is transmitted by a 10 Gbps optical transmission system, wherein FIG. 7A illustrates the phase shift of the optical signal, and in addition, FIG. 7B illustrates the waveform of the output optical signal after dispersion compensation (with dispersion compensation) (refer to signal waveform C in FIG. 2).

Here, in FIG. 7A, the horizontal axis shows the relative frequency $v-v_0$ (GHz) vis-à-vis median frequency $v_0$=189.1 THz. In addition, the vertical axis shows the rate of change of phase shift dφ/dv (rad/GHz) corresponding to dispersion $D^{(2)}$=+1200 ps/nm and phase shifts φ and –ψ (rad).

For each frequency component of the input optical signal shown in FIG. 6A, due to dispersion $D^{(2)}$ in the above-mentioned optical transmission line, the parabolic phase shift φ shown in FIG. 7A develops in the post-propagation output optical signal shown in FIG. 6B. In this regard, in this example, dispersion compensation is performed with the half-width of frequency band being set to δv=15 GHz, and frequency resolution set to Δv=3 GHz.

At this point, in variable dispersion compensator 1, phase shift ψ, which is shown as the graph of –ψ in FIG. 7A, is applied to each frequency component of the optical signal. This graph of phase shift ψ with a stepped-shape at frequency width Δv=3 GHz corresponds to the array of the plurality of reflective mirrors 30 in reflective mirror group 3. In other words, the direction of the horizontal axis of phase shift ψ corresponds to the position of reflective mirror 30 along the v-axis. In addition, the direction of the vertical axis corresponds to the position of reflective mirror 30 along the d-axis (refer to FIG. 1).

Reflective mirror group 3, as shown in FIG. 7A, is configured so that the two phase shifts match with –ψ=φ($v_i$) at the respective median frequency $v_i$ for the frequency component of frequency width Δv reflected by each reflective mirror $30_i$. With such configuration, phase shift φ, which develops in the optical signal along the optical transmission line, is negated to the greatest extent possible by phase shift ψ, which is applied by variable dispersion compensator 1.

As shown in FIG. 7B by the signal waveform of the post-dispersion compensation output optical signal, dispersion in the optical signal is sufficiently compensated.

Figure 8A:
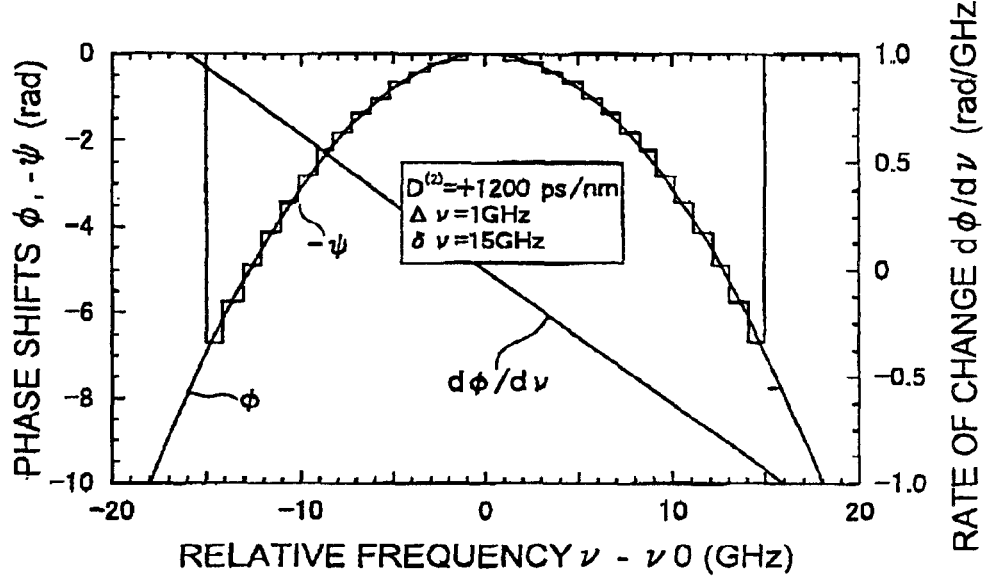
FIGS. 8A and 8B are graphs of another example of (A) the phase shift of an optical signal, and (B) the post-dispersion compensation output optical signal in a 10 Gbps optical transmission system.
Figure 8B:
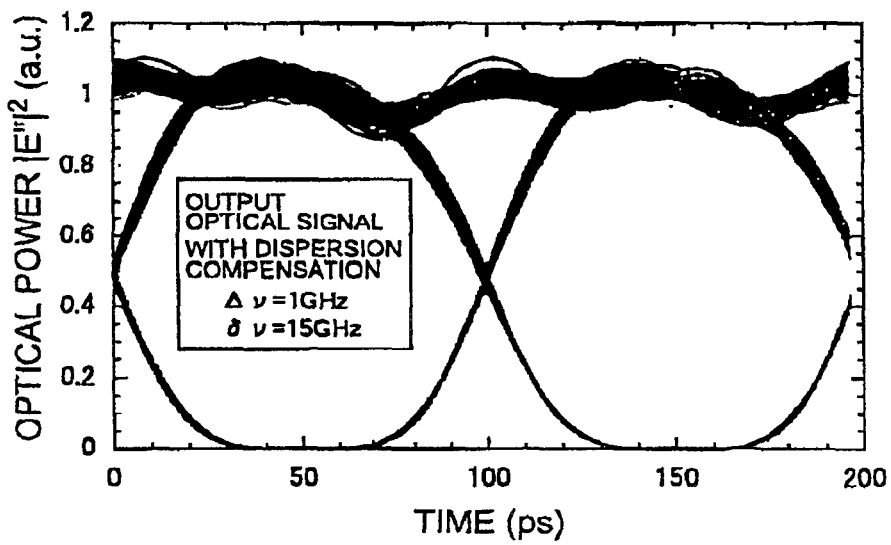

FIGS. 8A and 8B are graphs of another example of dispersion compensation of an optical signal propagated by a 10 Gbps optical transmission system, wherein FIG. 8A shows the phase shift of the optical signal, and in addition, FIG. 8B shows the signal waveform of the post-dispersion compensation output optical signal. It is noted that in the graph of FIG. 8A, the rate of change of phase shift dφ/dv and phase shift Φ are the same as that shown in FIG. 7A.

For each frequency component of the input optical signal shown in FIG. 6A, due to dispersion $D^{(2)}$ in the above-mentioned optical transmission line, the parabolic phase shift φ shown in FIG. 8A develops in the post-propagation output optical signal shown in FIG. 6B. In this regard, in this example, dispersion compensation is performed with the half-width of frequency band being set to δv=15 GHz, and frequency resolution set to Δv=1 GHz.

At this point, in variable dispersion compensator 1, phase shift ψ, which is shown as the graph of –ψ in FIG. 8A, is applied to each frequency component of the optical signal. This graph of phase shift ψ with a stepped-shape at frequency width Δv=1 GHz corresponds to the array of the plurality of reflective mirrors 30 in reflective mirror group 3.

Reflective mirror group 3, as shown in FIG. 8A, is configured so that the two phase shifts match with –ψ=φ($v_i$) at the respective median frequency $v_i$ for the frequency component of frequency width Δv reflected by each reflective mirror $30_i$. With such configuration, phase shift φ, which develops in the optical signal along the optical transmission line, is negated to the greatest extent possible by phase shift ψ, which is applied by variable dispersion compensator 1. As shown in FIG. 8B by the signal waveform of the post-dispersion compensation output optical signal, dispersion in the optical signal is sufficiently compensated. In particular, in this example, by making the frequency resolution Δv 1 GHz, which is smaller than the 3 GHz of the example shown in FIGS. 7A and 7B, the accuracy of dispersion compensation is improved.

Next, an example of dispersion compensation in the case where the bit rate is made to be M=40 Gbps is shown. With this 40 Gbps bit rate, the clock that is to become the period of the signal is 25 ps.

Figure 9A:
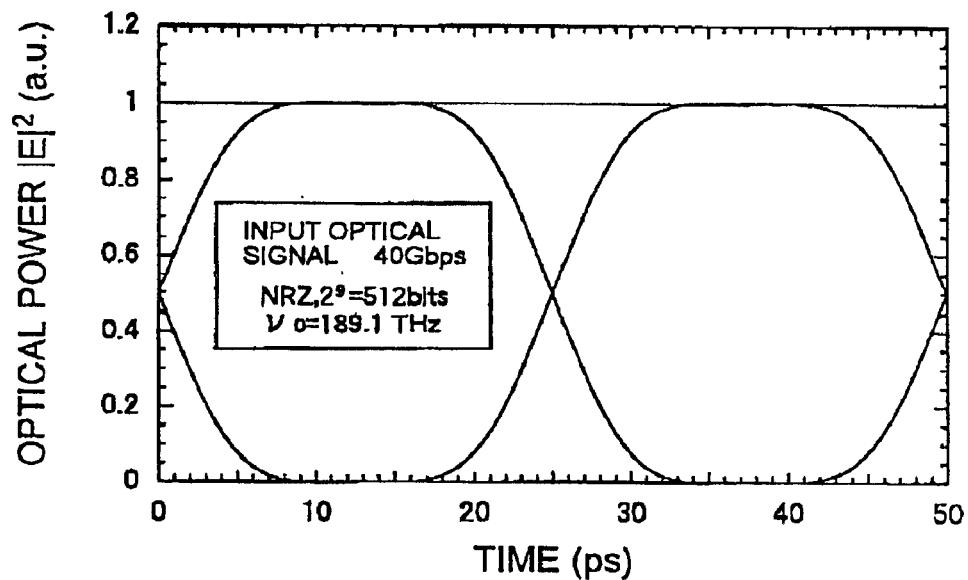
FIGS. 9A and 9B are graphs of an example of (A) the input optical signal, and (B) the pre-dispersion compensation output optical signal in a 40 Gbps optical transmission system.
Figure 9B:
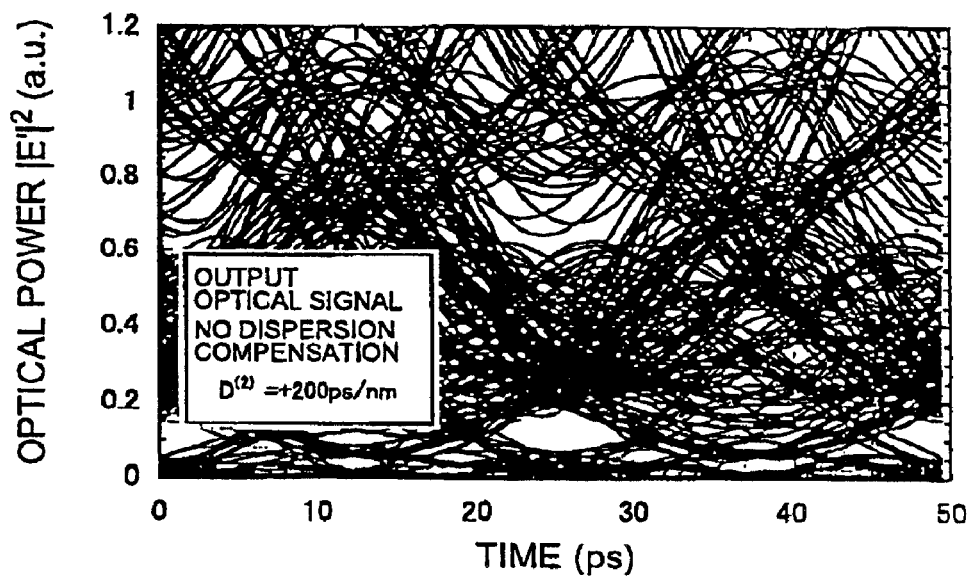

FIGS. 9A and 9B are graphs illustrating an example of the optical signal that the 40 Gbps optical transmission system transmits, wherein FIG. 9A illustrates the signal waveform of the input optical signal immediately after the transmitter; and FIG. 9B illustrates the signal waveform of the output optical signal before dispersion compensation.

The input optical signal having the signal waveform shown in FIG. 9A has frequency components in a frequency range of approximately ±50 GHz, with optical signal frequency $v_0$=189.1 THz as the median. In this regard, when the dispersion that develops in the optical signal due to propagation in the optical transmission line is set as $D^{(2)}$=+200 ps/nm, $D^{(3)}$=0 ps/nm$^2$, the signal waveform in the post-propagation output optical signal becomes a waveform with developed waveform deterioration due to dispersion, as shown in FIG 9B.

Figure 10A:
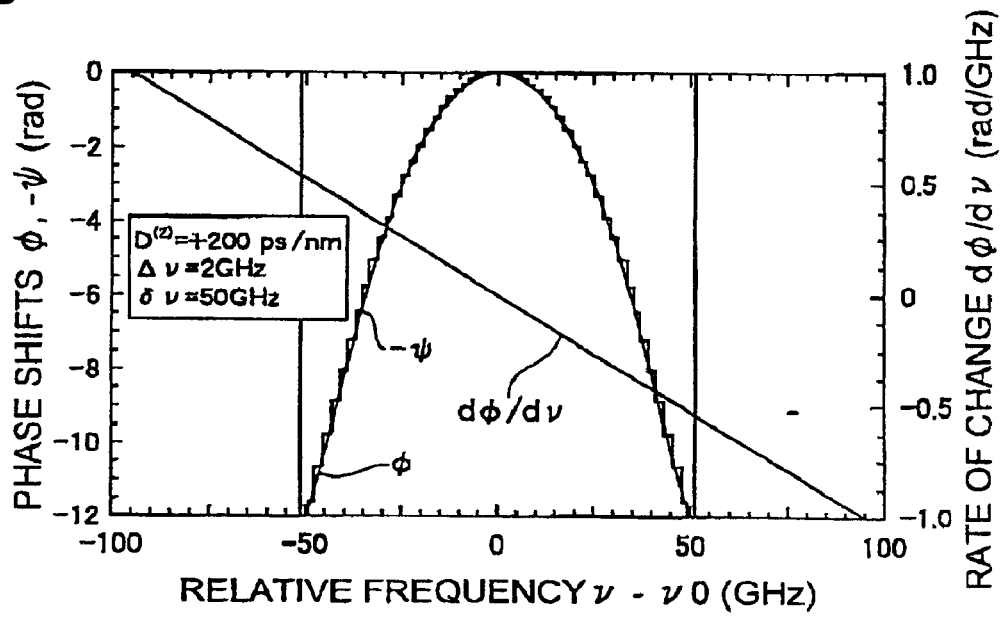
FIGS. 10A and 10B are graphs of an example of (A) the phase shift of an optical signal, and (B) the post-dispersion compensation output optical signal in a 40 Gbps optical transmission system.
Figure 10B:
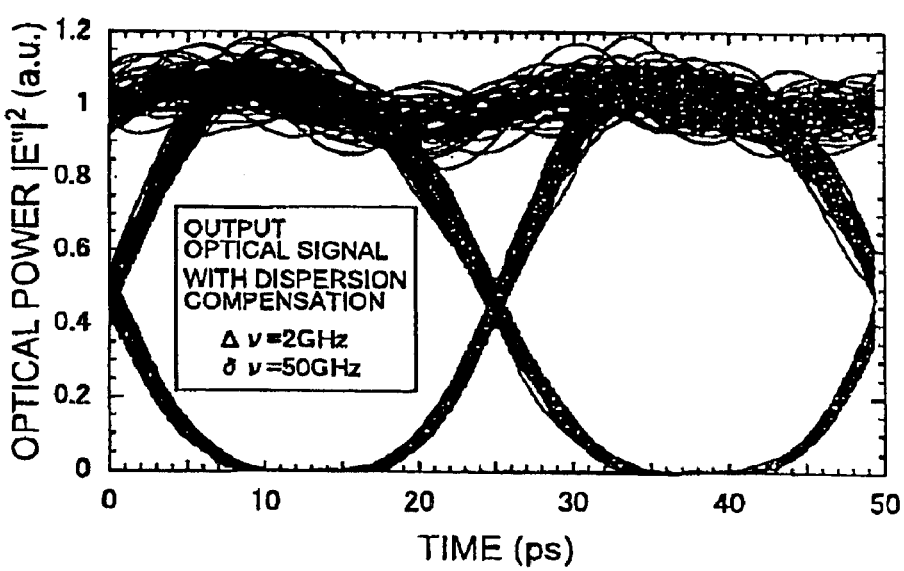

FIGS. 10A and 10B are graphs showing an example of dispersion compensation for an optical signal that is transmitted by a 40 Gbps optical transmission system, wherein FIG. 10A illustrates the phase shift of the optical signal, and in addition, FIG 10B illustrates the waveform of the output optical signal after dispersion compensation.

Here, in FIG. 10A, the horizontal axis shows the relative frequency $v-v_0$ (GHz) vis-à-vis median frequency $v_0$=189.1

THz. In addition, the vertical axis shows the rate of change of phase shift dφ/dv (rad/GHz) corresponding to dispersion $D^{(2)}$=+200 ps/nm and phase shifts φ and –ψ (rad).

For each frequency component of the input optical signal shown in FIG. 9A, due to dispersion $D^{(2)}$ in the above-mentioned optical transmission line, the parabolic phase shift φ shown in FIG. 10A develops in the post-propagation output optical signal shown in FIG. 9B. In this regard, in this example, dispersion compensation is performed with the half-width of frequency band being set to δv=50 GHz, and frequency resolution set to Δv=2 GHz.

At this point, in variable dispersion compensator 1, phase shift ψ, which is shown as the graph of –ψ in FIG. 10A, is applied to each frequency component of the optical signal. This graph of phase shift ψ with a stepped-shape at frequency width Δv=2 GHz corresponds to the array of the plurality of reflective mirrors 30 in reflective mirror group 3.

Reflective mirror group 3, as shown in FIG. 10A, is configured so that the two phase shifts $-\psi=\phi(v_i)$ match at the respective median frequency $v_1$ for the frequency component of frequency width Δv reflected by each reflective mirror $30_i$. With such configuration, phase shift φ, which develops in the optical signal along the optical transmission line, is negated to the greatest extent possible by phase shift ψ, which is applied by variable dispersion compensator 1. As shown in FIG. 10B by the signal waveform of the post-dispersion compensation output optical signal, dispersion in the optical signal is sufficiently compensated.

In the above-mentioned embodiment, as shown in FIG. 1 and FIG. 3, reflective mirror group 3, comprising a plurality of movable reflective mirrors 30, is utilized as reflecting means. Contrarily, it is also possible to use a single movable reflective mirror, which is not divided into a plurality of reflective mirrors, as reflecting means.

Figure 11A:
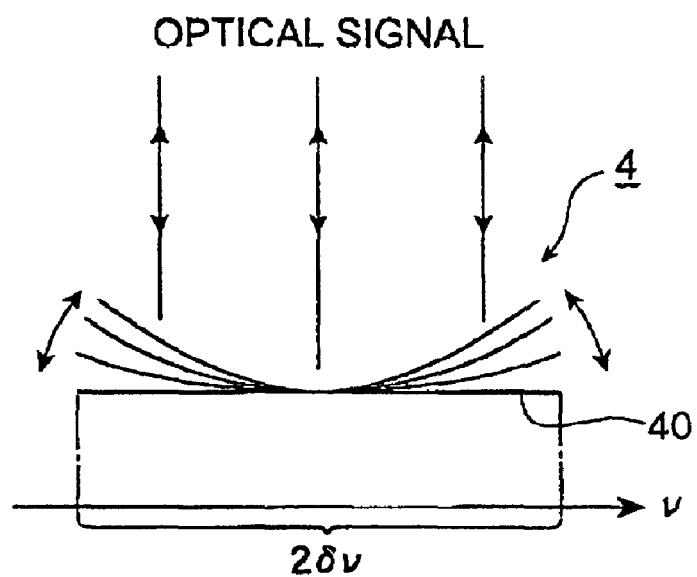
FIGS. 11A and 11B are diagrams showing another example of a movable reflective mirror.
Figure 11B:
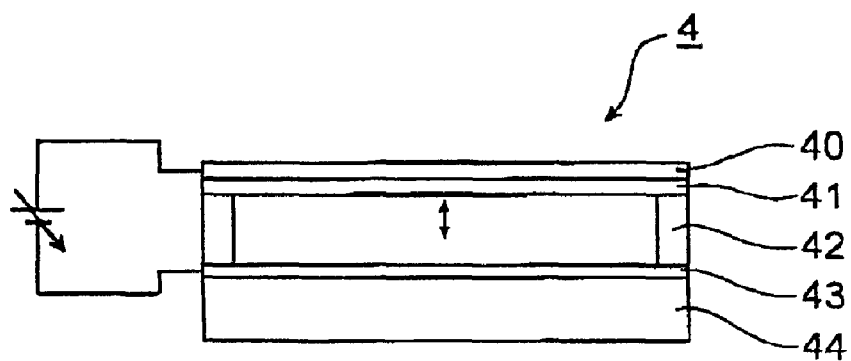

FIG. 11A and FIG. 11B are diagrams illustrating a movable reflective mirror when using a single movable reflective mirror as reflecting means in variable dispersion compensation, wherein FIG. 11A is a schematic showing the shape and driving method thereof, and FIG. 11B is a block diagram showing a more specific example.

Reflecting means 4 shown in FIG. 11A and FIG. 11B comprises single movable reflective mirror 40. By making the entire reflective surface of this movable reflective mirror 40 into a shape having a curved surface (for example, making it into a shape having a parabolic-shape) as shown in FIG. 11A, it is possible to shift the respective reflective surface portion corresponding to each frequency component of the optical signal in the direction of optical signal propagation. Through this, variable dispersion compensation can be performed with favorable accuracy in the same manner as reflective mirror group 3, which comprises a plurality of divided movable reflective mirrors 30.

The structural example shown in FIG. 11B, for example, may be used as a more specific structure of reflecting means 4 having such single movable reflective mirror 40. With this reflecting means 4, a metal layer 40, which becomes a movable reflective mirror, is formed upon polysilicon layer 41. In addition, this metal layer 40 functions as a first electrode provided on the movable reflective mirror.

On the side opposite metal layer 40 of polysilicon layer 41, there is disposed metal layer 43, which is formed upon silicon layer 44. This metal layer 43 becomes the second electrode provided at a predetermined position relative to the first electrode. In addition, polysilicon layer 41 and metal layer 43 are separated by silicon oxide layer 42. This silicon oxide layer 42 is provided at the ends of polysilicon layer 41 and metal layer 43.

Between metal layer 40, which functions as a movable reflective mirror together with being the first electrode, and metal layer 43, which is the second electrode, there is connected a variable power source, which adjustably applies a voltage. When the applied voltage between this metal layer 40 and metal layer 43 changes, a deflection due to the generated electrostatic force, or the change thereof, develops in the middle of metal layer 40 and polysilicon layer 41 where silicon oxide layer 42 is not provided to change the curved shape of the reflective surface and therefore shift the respective reflection surface portions. In cases where an AWG is utilized similar to optical combining/splitting unit 2 of the embodiment shown in FIG. 3, it is preferable that reflecting means 4 with such configuration be disposed along the output terminal of the second slab waveguide.

Figure 12:
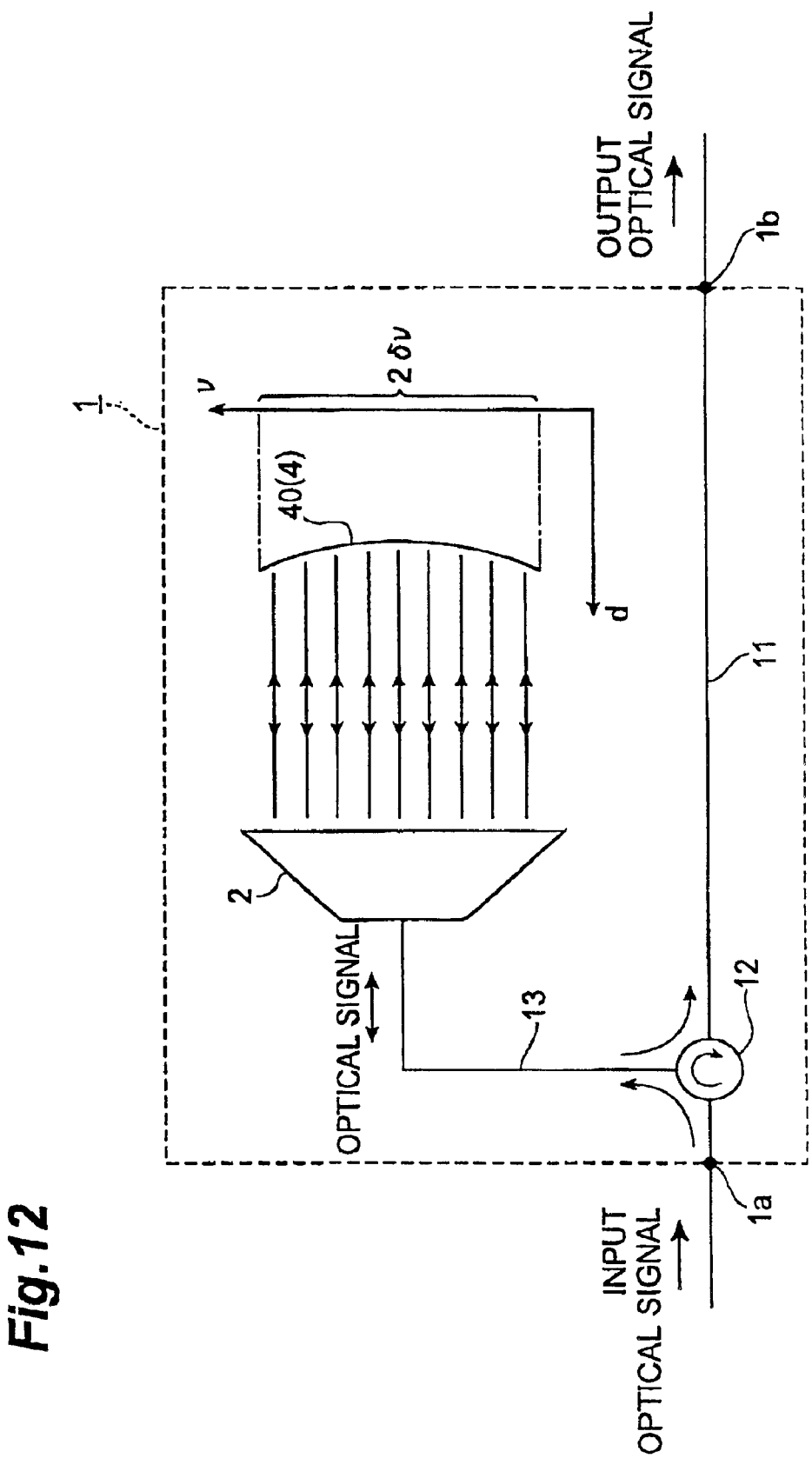
FIG. 12 is a block diagram that illustratively shows another embodiment of a variable dispersion compensator.

FIG. 12 is a block diagram that illustratively shows another embodiment of a variable dispersion compensator when using the single reflective mirror as reflective means. Variable dispersion compensator 1 of this embodiment, similar to the variable dispersion compensator illustrated in FIG. 1, applies a predetermined amount of phase shift to an input optical signal to compensate the dispersion of the optical signal, and is configured comprising optical combining/splitting unit 2 and reflective means 4. In addition, regarding the dispersion compensation functionality, the amount of phase shift that is applied to each frequency component of the optical signal for dispersion compensation is variable.

In variable dispersion compensator 1 shown in FIG. 12, optical transmission line 11, optical circulator 12 and optical transmission line 13 for dispersion compensation have the same structure as those of the variable dispersion compensator illustrated in FIG. 1.

The aforementioned optical combining/splitting unit 2 and reflective means 4 are disposed in this order at the end of the side opposite optical circulator 12 of optical transmission line 13 for dispersion compensation. This optical combining/splitting unit 2 and this reflective means 4 apply a phase shift to an optical signal, whereby the dispersion thereof is compensated.

Optical combining/splitting unit 2 is a single optical combining/splitting means, which functions as an optical splitting means that inputs the pre-dispersion compensation optical signal and demultiplexes every frequency component of the optical signal within a predetermined frequency band, and functions as an optical combining means that combines each frequency component of the optical signal to give the post-dispersion compensation optical signal. The optical signal that is to become the subject of dispersion compensation, in this optical combining/splitting unit 2, is split or combined by frequency v (or wavelength λ) along a predetermined splitting direction (direction of the v-axis in FIG. 12).

In addition, reflective means 4 is a reflecting means that reflects the respective frequency components of the optical signal that is split by optical combining/splitting unit 2 to apply a predetermined phase shift to each frequency component. Phase shift is applied to each frequency component of the optical signal using the optical path length and optical path length differences from optical combining/splitting unit 2 (optical splitting means) through reflective means 4 until again reaching optical combining/splitting unit 2 (optical combining means). In addition, this reflective means 4 is configured to be variable in terms of the reflecting point for the respective frequency components along the direction of optical signal propagation (direction of the d-axis shown in FIG. 12).

Reflective means 4, which is a reflecting means in this embodiment, is structured from a single reflective mirror 40. This single reflective mirror 40 is disposed in the direction of the v-axis, which is the direction of the splitting of optical signal and approximately perpendicular to the direction of optical signal propagation, as the direction of spread of reflective surface; and in accordance with this, reflective means 4, which reflects the respective frequency components of the optical signal within the entire frequency band that is to be subjected to dispersion compensation, is formed. The structure and driving method of reflective mirror 40 is as per the description of FIG. 11A.

In the above configuration, the optical signal, which is the subject of dispersion compensation and input to variable dispersion compensator 1 from input terminal 1a, is input to optical combining/splitting unit 2 through optical transmission line 11, optical circulator 12, and optical transmission line 13, and is split off into frequency components by the frequency v thereof. Each frequency component of the optical signal that has been split is propagated towards reflective means 4, and is reflected at a predetermined reflection position by corresponding reflective surface portion of reflective mirror 40. Each frequency component that has been reflected is then combined again by optical combining/splitting unit 2 to become a post-dispersion compensation optical signal, and is output to an external portion from output terminal 1b through optical transmission line 13, optical circulator 12, and optical transmission line 11.

Here, the reflection position of a frequency component of the optical signal for each reflective surface of reflective mirror 40 of reflective means 4 is determined based on the amount of phase shift that should be applied to that frequency component. The deformation of the reflective surface of reflective mirror 40, which is a movable mirror, is controlled so as to move the respective reflective surfaces in the direction of optical signal propagation and into the set reflection position; as a result, dispersion compensation of the optical signal is achieved within the entire frequency band.

With the variable dispersion compensator according to the present embodiment, similar to the variable dispersion compensator of the embodiment illustrated in FIG. 1, arbitrary phase adjustment is possible since the phase shift provided to the respective frequency components of the optical signal becomes variable, and the dispersion generated in the optical signal can be compensated with high precision. Moreover, by applying this variable dispersion compensator in an optical transmission system, the dispersion generated in the optical signal propagated through the optical transmission line can be compensated with high precision and favorable controllability, and realized thereby is an optical transmission system capable of reliably preventing waveform deterioration or the like of optical signals.

Figure 13:
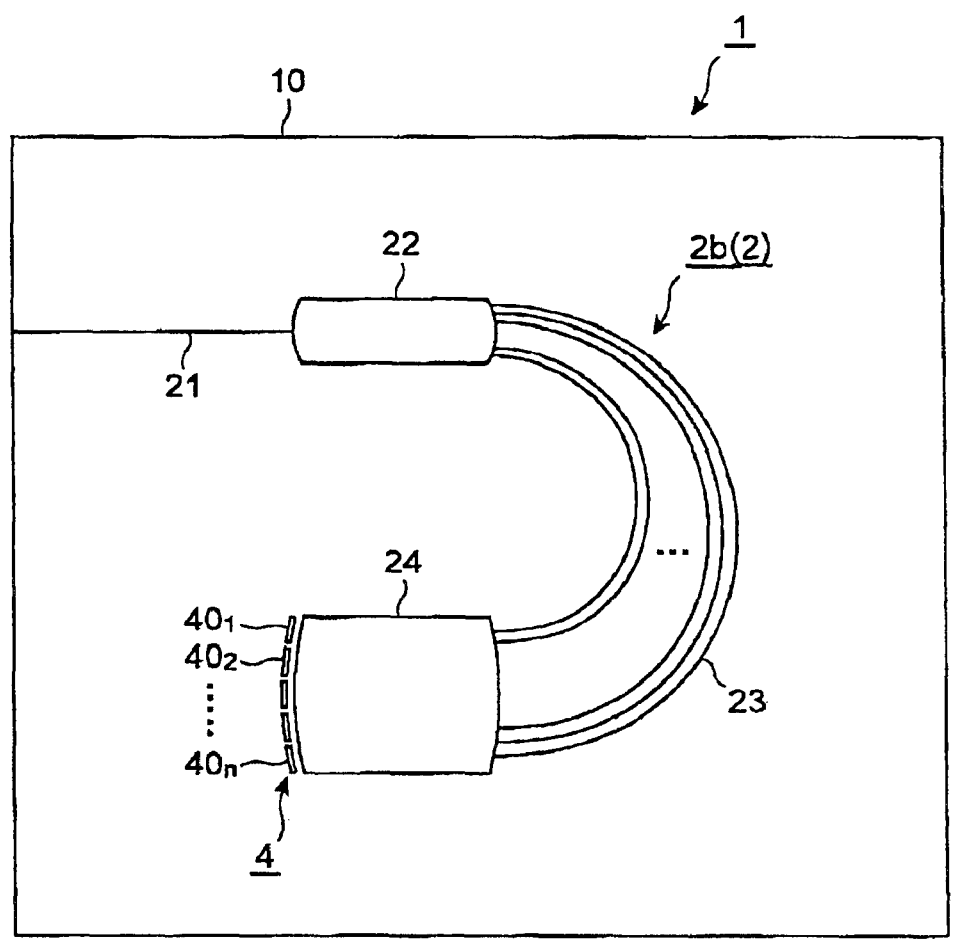
FIG. 13 is a plan view showing a concrete structural example of the variable dispersion compensator according to the embodiment illustrated in FIG. 12.

FIG. 13 is a plan view showing a concrete structural example of the variable dispersion compensator according to the embodiment illustrated in FIG. 12. Similar to FIG. 3, it is noted here that in FIG. 13, optical transmission line 11 and optical circulator 12, etc. are not shown, but only the optical circuit comprising optical combining/splitting unit 2 and reflective means 4, which actually perform dispersion compensation of an optical signal, is shown.

In variable dispersion compensator 1 of this example, Arrayed Waveguide Grating (AWG) 2b with a planar waveguide type optical circuit that is formed in a predetermined waveguide pattern upon substrate 10 is used as optical combining/splitting unit 2, which splits and alternately combines an optical signal that is to become the subject of dispersion compensation.

AWG 2b is configured including input/output channel waveguide 21, the end thereof being made into an input/output port; first slab waveguide 22, which is connected to input/output channel waveguide 21; array waveguide portion 23, which comprises a plurality of channel waveguides that are connected to first slab waveguide 22 with each differing in optical path length from the others; and second slab waveguide 24, which is connected to array waveguide portion 23. Moreover, movable reflective mirror 40, which is reflective means 4, is provided to the side opposite array waveguide portion 23 of second slab waveguide 24.

Here, with variable dispersion compensator 1 illustrated in FIG. 13, shown is a structural example where n number of movable reflective mirrors $40_1$ to $40_n$ is provided as reflective means 4. Each of these movable mirrors $40_1$ to $40_n$ corresponds to reflective mirror 40 illustrated in FIG. 11A and FIG. 12, respectively. In other words, in this structural example, the frequency band of the optical signal, which is the subject of dispersion compensation, is divided into n number of bands, and, dispersion compensation is performed within the respective frequency bands by providing a single movable reflective mirror 40 illustrated in FIG. 12 for each n number of frequency bands divided as described above.

Each of movable mirrors $40_1$ to $40_n$ structuring reflective means 4 is a movable mirror capable of moving each of the reflective surfaces corresponding to each frequency component in the optical signal propagation direction by deforming its entire reflective surface. The deformation method of the reflective surface is as per the description of reflective mirror 40 illustrated in FIG. 11A and FIG. 12.

In the above configuration, when an optical signal is input to input/output channel waveguide 21 from the input/output port of AWG 2b, the optical signal is split into every frequency (every wavelength) while being guided through first slab waveguide 22, array waveguide portion 23, and second slab waveguide 24, in that order.

Each frequency component of the optical signal that has been split is reflected with corresponding movable reflective mirrors $40_1$ to $40_n$ of reflective means 4 per frequency band divided into n numbers. Each frequency component is then combined while being guided through second slab waveguide 24, array waveguide portion 23, and first slab waveguide 22, in that order, outputting the dispersion compensated optical signal from the input/output port through input/output channel waveguide 21.

Further, the reflective means structured from n number of reflective mirrors illustrated in FIG. 13, for example, may be used in cases when n channels of optical signals each having a different wavelength are the subject of dispersion compensation. Here, dispersion compensation is performed by reflecting the optical signal with a movable reflective mirror corresponding to each of the n channels of optical signals.

Generally, it is preferable to set the number of movable reflective mirrors in accordance with the number of channels of optical signals subject to dispersion compensation or the broadness of the frequency band of the optical signal. For example, when the optical signal is 1 channel, or when the frequency band is relatively narrow in a plurality of channels, the structure may be such that n=1 as shown in FIG. 12 and to provide one movable reflective mirror 40 for the entire exit of second slab waveguide 24.

Figure 14A:
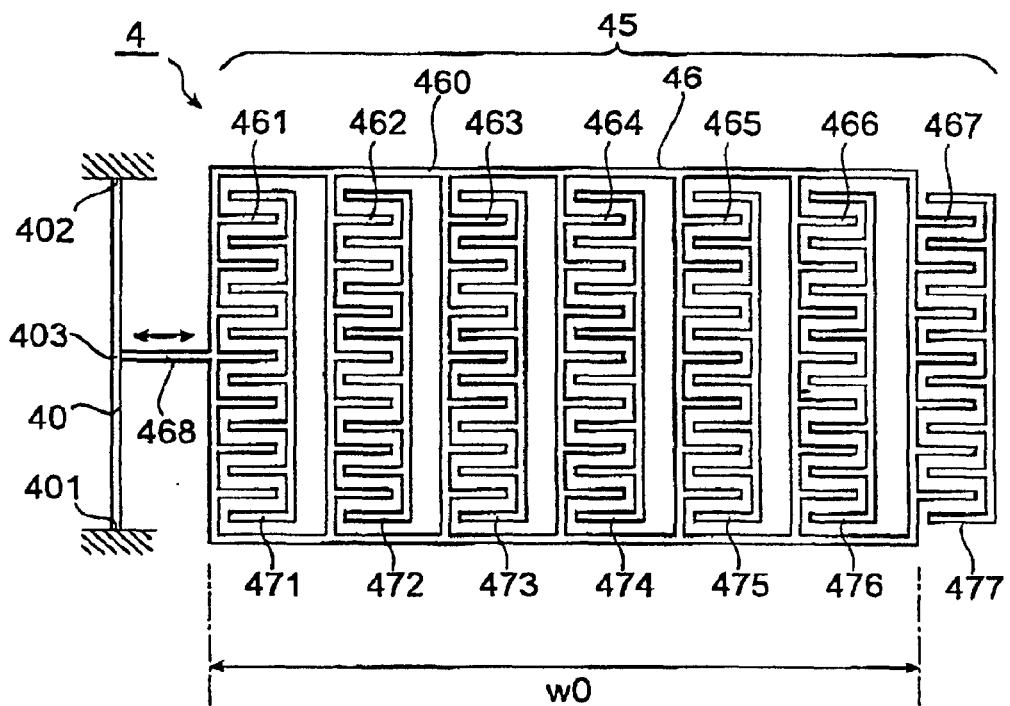
FIG. 14A and FIG. 14B are structural diagrams showing another example of a movable reflecting mirror.

FIG. 14A is a diagram showing another structural example of the movable reflective mirror in the case of using a single reflective mirror. With this reflective means 4, similar to the reflective means illustrated in FIG. 11A and FIG. 11B, a single movable reflective mirror 40 is used, and the structure is such that each of the reflective surfaces thereof may be moved in the optical signal propagation direction by deforming the entire reflective surface thereof into a curved surface shape.

With movable reflective mirror 40 of reflective means illustrated in FIG. 14A, portions 401 and 402 in the vicinity of the end portions on both sides thereof are provided as fixed portions, and the portion 403 in the vicinity of the center thereof is provided as a drive portion capable of being driven in the optical signal propagation direction with driving means. And, comb drive 45, which is driving means for driving drive portion 403 in the optical signal propagation direction, is connected to this drive portion 403.

Comb drive 45 in this embodiment comprises a structure of combining a comb-shaped electrode in 7 sections. Seven sections of comb-shaped electrodes 461 to 467 are provided, with respect to frame shape electrode 460 having a width w0 in the drive direction, to drive electrode 46 for driving movable reflective mirror 40 in the optical signal propagation direction. This drive electrode 46 is established with the drive direction as a direction approximately perpendicular to movable reflective mirror 40, which is a propagation direction of the optical signal reflected with movable reflective mirror 40, and connected to drive portion 403 of movable reflective mirror 40 via connection portion 468.

Seven sections of comb-shaped electrodes 471 to 477 are provided so as to mutually engage with corresponding comb-shaped electrode portions 461 to 467, respectively, with respect to the comb-shaped electrode portions 461 to 467 of these drive electrodes 46. These comb-shaped electrodes 471 to 477 are fixed to a substrate or the like to which is provided movable reflective mirror 40 and the respective electrodes, and, for example, are electrically connected to each other so as to have the same potential.

In comb drive 45 having the foregoing electrode structure, by applying power voltage between drive electrode 46 including comb-shaped electrode portions 461 to 467 and comb-shaped electrodes 471 to 477, drive electrode 46 moves in the drive direction, which is the optical signal propagation direction, pursuant to static electricity with respect to the fixed comb-shaped electrodes 471 to 477. Here, drive portion 403 in the vicinity of the center of movable reflective mirror 40 connected to drive electrode 46 via connection portion 468 is driven in the optical signal propagation direction, and the entire reflective surface thereof becomes deformed.

As described above, according to the structure of driving and deforming the portion in the vicinity of the center of movable reflective mirror 40, as a result of deforming the entire reflective surface of reflective mirror 40 by making if link with the deformation of drive portion 403 in the center, each of such reflective surfaces can be effectively moved in the optical signal propagation direction.

Moreover, when making the portion 403 in the vicinity of the center of movable reflective mirror 40 the drive portion, it is necessary to fix a prescribed portion other than drive portion 403. With respect to this portion to be fixed, for example, as illustrated in the structural example of FIG. 14A, it is preferable that portions 401, 402 in the vicinity of the end portions on both sides are provided as the fixed portions. Or, portions other than in the vicinity of the end portions, for example, portions between the center and end portion may be fixed.

Figure 14B:
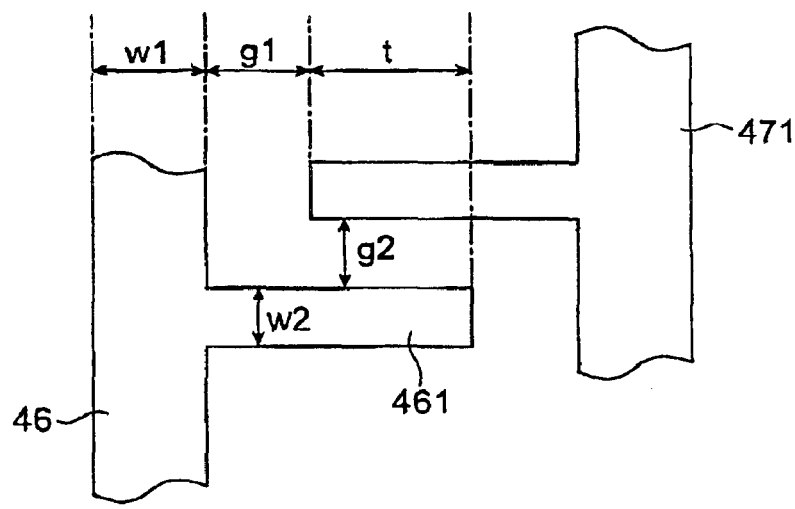

An example of a concrete structure of comb drive 45 shown in FIG. 14A is explained with reference to the partially enlarged view of comb-shaped electrode portion 461 of drive electrode 46 and corresponding comb-shaped electrode 471 illustrated in FIG. 14B. Foremost, as the overall drive electrode 46, width in the longitudinal of frame-shaped electrode portion 460 was set to w0=610 μm, and structured as a 7-section electrode as depicted in FIG. 14A.

Further, regarding the structure and the like of the respective comb-shaped electrodes, the width of the comb-shaped electrode was set to w2=10 μm, the gap in the drive direction between the comb-shaped electrodes in a state where drive electrode 46 is in its initial position was set to g1=60 μm, the gap between the combs in the direction perpendicular to the drive direction was set to g2=10 μm, the length of the overlapping portion of the comb-shaped electrodes was set to t=10 μm, the height of the respective electrodes was set to 50 μm, and the number of comb-shaped electrodes is set to 19. As for movable reflective mirror 40, the distance from drive portion 403 in the center to fixed portion 401 or 402 at the end was set to 100 μm, and the thickness was set to 2.5 μm.

In comb drive 45 having the foregoing structure, upon applying a 100V power voltage between drive electrode 46 and comb-shaped electrodes 471 to 477, the displacement of drive electrode 46 and drive portion 403 of movable reflective mirror 40 connected to drive electrode 46 was 0.2 μm. Movable reflective mirror 40 develops a deflection pursuant to the displacement of this drive portion 403, and the entire reflective surface deforms as a result thereof.

Figure 15:
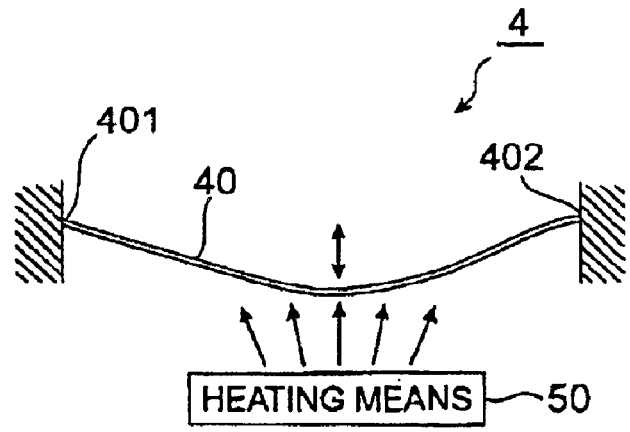
FIG. 15 is a structural diagram showing another example of the movable reflecting mirror.

FIG. 15 is a diagram showing another structure example of a movable reflective mirror in a case of using a single reflective mirror. With this reflective means 4, similar to the reflective means illustrated in FIG. 11A, a single reflective mirror 40 is used, and the structure is such that each of the reflective surfaces moves in the optical signal propagation direction by deforming the entire reflective surface into a curved surface shape.

Movable reflective mirror 40 of reflective means 4 illustrated in FIG. 15 has portions 401, 402 in the vicinity of the end portions on both sides thereof as the fixed portions. And, as illustratively shown in FIG. 15, heating means 50 for heating movable reflective mirror 40 is provided to a prescribed portion (partially or entirely) of movable reflective mirror 40.

In the aforementioned structure, when a part or the whole of the portion of movable reflective mirror 40 is heated with heating means 50, movable reflective mirror 40 deforms pursuant to thermal expansion or the like, and the entire reflective surface deforms as a result thereof.

As described above, by making the structure such that movable reflective mirror 40 is heated and deformed, it becomes possible to deform the reflective surface of a movable mirror with a heating means, and it is thereby possible to simplify the structure thereof and the miniaturize the dispersion compensator. For example, upon applying heat of Δt=300° C. to an Si beam having a thickness of 2.5 μm, 4 μm of displacement was obtained at the portion in the vicinity of the center of movable reflective mirror 40.

Here, when employing the structure of fixing the portion in the vicinity of the end portions on both sides of movable reflective mirror 40 and deforming the reflective surface, in comparison to the structure of fixing the portion in the vicinity of the center of movable reflective mirror 40 and deforming the reflective surface, force to be applied to reflective mirror 40 is smaller in the structure of fixing the portion in the vicinity of the center and driving the portion in the vicinity of the end portion.

Figure 16A:
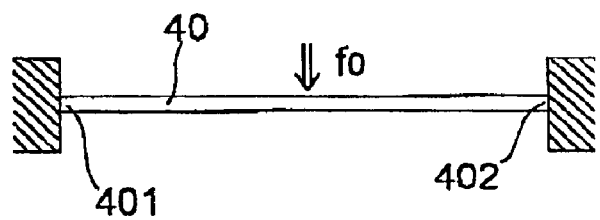
FIG. 16A through FIG. 16C are diagrams for explaining the driving method of the movable reflective mirror.
Figure 16B:
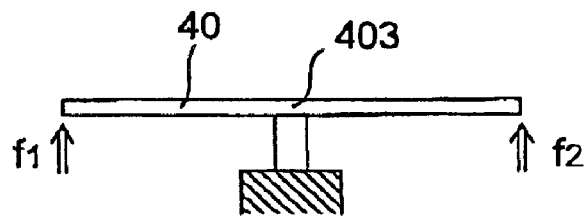

In other words, as shown in FIG. 16A and FIG. 16B, when comparing the case of fixing portions 401, 402 in the vicinity of end portions on both sides thereof with the case of fixing portion 403 in the vicinity of the center with respect to movable reflective mirror 40 having the same shape, with the structure of fixing portions 401, 402 in the vicinity of the end portions (FIG. 16A), force of f0=8.7×10$^4$ µN was required in order to displace the portion in the vicinity of the center 5 µm.

Contrarily, with the structure of fixing portion 403 in the vicinity of the center (FIG. 16B), when applying force of f1=f2=f0/2=4.35×10$^4$ µN, respectively, to the portion in the vicinity of the end portion so as to make the total force equal the aforementioned example, the displacement of the portion in the vicinity of the end portion approximately quadrupled to 19.6 µm. Moreover, when making the displacement of movable reflective mirror 40 similar to the above at 5 µm, the total force to be applied to the portion in the vicinity of the end portion became approximately ¼ the force at approximately 2×10$^4$ µN.

As described above, by employing the structure of driving the portion in the vicinity of the end portion of the movable mirror, the force necessary to be applied for driving the movable mirror becomes small, and the entire reflective surface thereof can easily be deformed.

Figure 16C:
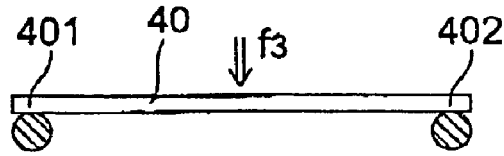

Moreover, as the structure of deforming the reflective surface by fixing the portion in the vicinity of the end portion on both sides of movable reflective mirror 40, in addition to the structure of completely fixing portions 401, 402 in the vicinity of the end portion shown in FIG. 16A, the structure shown in FIG. 16C may also be employed. With the structure shown in FIG. 16C, portions 401, 402 in the vicinity of the end portion on both sides are fixed with respect to the application direction of force f3 to be the drive direction of movable reflective mirror 40, but can move in the longitudinal direction of movable mirror 40 perpendicular to the drive direction.

With the structure shown in FIG. 16C, when the displacement of movable reflective mirror 40 is made the same, the force f3 to be added will become approximately ¼ the force of force f0 of FIG. 16A. Therefore, according to this type of structure, the force necessary to be applied for driving the movable mirror will become small, thereby making the deformation of the entire reflective surface easier.

Figure 17:
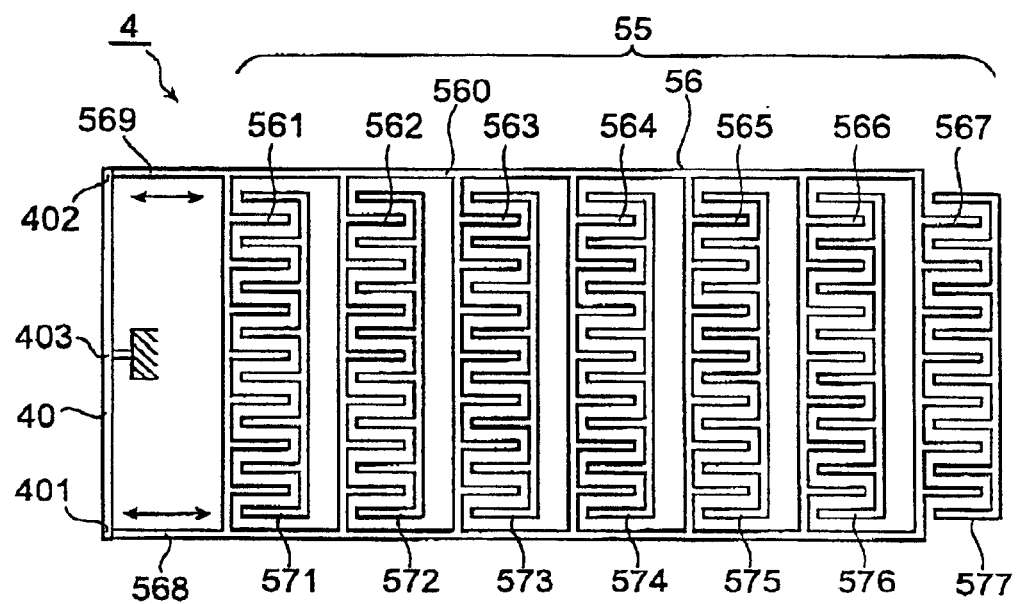
FIG. 17 is a structural diagram showing another example of the movable reflective mirror.

FIG. 17 is a diagram showing a structural example upon fixing the portion in the vicinity of the center thereof with respect to the movable reflective mirror when using a single reflective mirror. This reflective means 4 comprises single movable reflective mirror 40, comb drive 55 including drive electrode 56 structured of frame-shaped electrode portion 560 and comb-shaped electrode portions 561 to 567, and comb-shaped electrodes 571 to 577, and has a structure similar to the reflective means shown in FIG. 14A regarding the example of fixing the portion in the vicinity of the end portion.

With movable reflective mirror 40 of reflective means 4 shown in FIG. 17, portion 403 in the vicinity of the center thereof is made the fixed portion, and portions 401, 402 in the vicinity of the end portion on both sides are provided as the drive portions capable of being driven in the optical signal propagation direction with a drive means And, the aforementioned comb drive 55, which is the drive means for driving drive portions 401, 402 in the optical signal propagation direction, is connected to such drive portions 401, 402 via connection portions 568, 569, respectively.

In the foregoing structure, when applying a power voltage between drive electrode 56 including comb-shaped electrode portions 561 to 567 and comb-shaped electrodes 571 to 577, drive electrode 56 moves in the drive direction, which is the optical signal propagation direction, pursuant to static electricity with respect to the fixed comb-shaped electrodes 571 to 577. Here, drive portions 401, 402 in the vicinity of the center of movable reflective mirror 40 connected to drive electrode 56 via connection portions 568, 569 are driven in the optical signal propagation direction, and the entire reflective surface thereof becomes deformed. By employing the structure of driving drive portions 401, 402 in the vicinity of the end portion of movable reflective mirror 40 as described above, it becomes possible to deform the reflective surface with relatively small force.

The variable dispersion compensator according to the present invention and the optical transmission system comprising the same are not limited to the embodiments described above, and may be modified in various forms. For example, the optical combining/splitting unit, which performs splitting and combining of the optical signal is not limited to an AWG, but various elements may also be used, or alternatively, the optical splitting unit and optical combining unit may also be provided separately. Furthermore, in regards to the splitting of the optical signal, splitting may be performed so as to divide into a plurality of frequency components, for example, according to the configuration of the reflecting means, or alternatively, splitting may also be performed into a continuous spectral shape by frequency.

Figure 18:
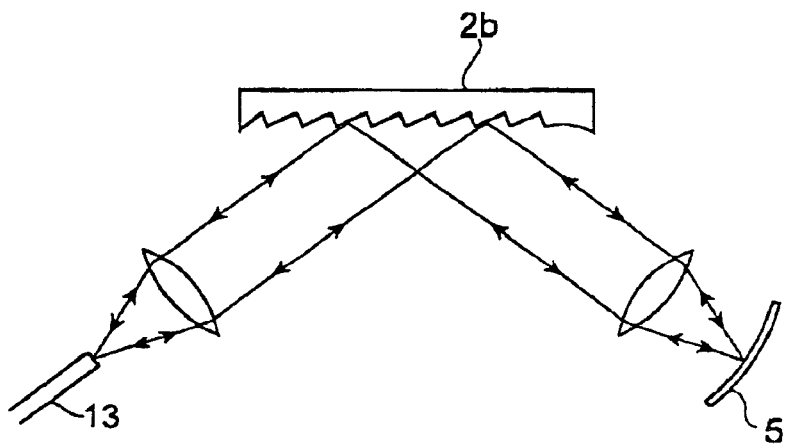
FIG. 18 is a block diagram that illustratively shows another embodiment of a variable dispersion compensator.

FIG. 18 is a block diagram that illustratively shows another embodiment of the variable dispersion compensator. In this embodiment, the optical signal from optical fiber transmission line 13, which is used for dispersion compensation, is input to diffractive grating 2b, which is an optical combining/splitting means, and is reflected for every frequency component at reflecting means 5. Each of the reflected frequency components is combined to become the post-dispersion compensation optical signal again by diffractive grating 2b, and is input towards optical fiber transmission line 13.

Figure 19:
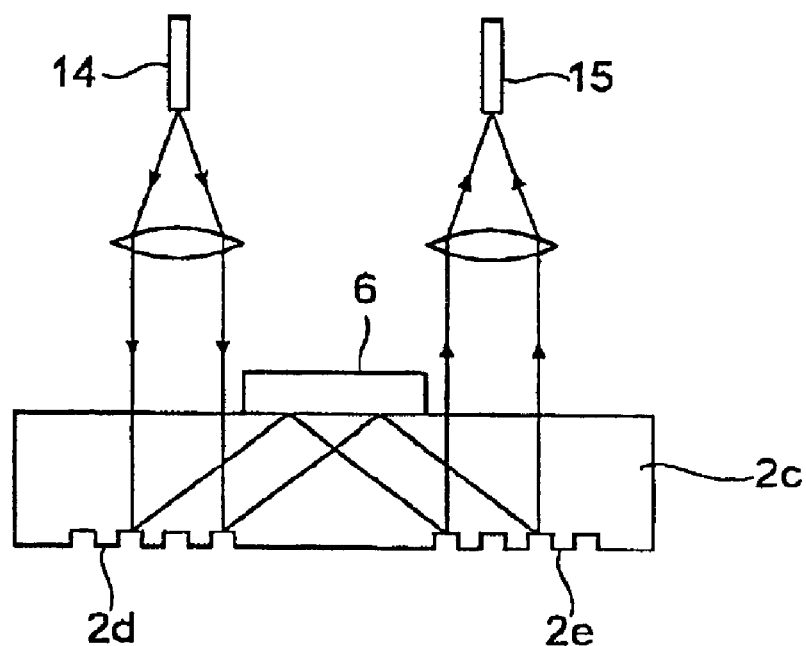
FIG. 19 is a block diagram that illustratively shows another embodiment of a variable dispersion compensator.

FIG. 19 is a block diagram that illustratively shows another embodiment of the variable dispersion compensator. In this embodiment, silicon oxide (SiO$_2$) plate 2c, which comprises two diffractive gratings 2d and 2e on the underside thereof, is used as optical combining/splitting means. The optical signal from optical fiber transmission line 14, which is used for input, is input to diffractive grating 2d, which is optical splitting means, after being incident on the top surface of plate 2c, and is reflected for every frequency component at reflecting means 6. Each of the reflected frequency components is then combined at diffractive grating 2e, which is optical combining means, to become the post-dispersion compensation optical signal, and is input toward optical fiber transmission line 15, which is used for output, through the top of plate 2c.

Besides these structural examples, optical splitting means, reflecting means, and optical combining means, or combinations thereof, are possible for adaptation of the various respective figurations.

The variable dispersion compensator and optical transmission system according to the present invention, as detailed in the above, are superior in the precision and controllability of dispersion compensation, and may be used as the variable dispersion compensator and optical transmission system in which the optical circuit thereof will be miniaturized. Namely, in accordance with a variable dispersion compensator in which the optical path length difference from an optical splitting means, through a reflecting means, until an optical combining means is used to apply phase shift to each frequency component of an optical signal, and also, the phase shift is changed using a reflecting means having a variable reflection position for each frequency component, make it possible to compensate dispersion that develops in an optical, signal accurately and with favorable controllability. Furthermore, since dispersion compensation is controlled only with reflecting means, it is possible to simplify the structure of an optical circuit, and accordingly, allow the size reduction of the optical circuit.

From the invention thus described, it will he obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A variable dispersion compensator, which applies a phase shift to an optical signal to compensate dispersion in said optical signal, characterized by comprising optical splitting means, which inputs an optical signal that is the subject of dispersion compensation, and splits said optical signal for every frequency component within a predetermined frequency band;

reflecting means, which reflects each of the respective said frequency components that are split by said optical splitting means to apply a predetermined phase shift to each frequency component, and is configured with the reflection position for each of the respective said frequency components being movable in the direction of optical signal propagation; and optical combining means, which combines said frequency components reflected by said reflecting means to give a dispersion compensated optical signal, characterized by said reflecting means comprising a plurality of reflective mirrors that are divided corresponding to said frequency components; and each of the respective said plurality of reflective mirrors being a movable mirror capable of having the reflective surface thereof shifted separately in said direction of optical signal propagation.

2. A variable dispersion compensator according to claim 1, characterized by said movable mirror, which comprises each of the respective said plurality of reflective mirrors, being configured to allow the use of electrostatic force, which develops from application of voltage between a first electrode provided on said movable mirror and a second electrode provided at a predetermined position relative to said first electrode, to separately shift the reflective surface thereof.

3. A variable dispersion compensator according to claim 1, characterized by an array of reflective mirrors or a shape of the reflective surface, which configures said reflecting means, being approximately parabolic in relation to said frequency component to be reflected.

4. A variable dispersion compensator, which applies a phase shift to an optical signal to compensate dispersion in said optical signal, characterized by comprising optical splitting means, which inputs an optical signal that is the subject of dispersion compensation, and splits said optical signal for every frequency component within a predetermined frequency band;

reflecting means, which reflects each of the respective said frequency components that are split by said optical splitting means, to apply a predetermined phase shift to each frequency component, and is configured with the reflection position for each the respective said frequency components being movable in the direction of optical signal propagation; and optical combining means, which combines said frequency components reflected by said reflecting means to give a dispersion compensated optical signal, characterized by said reflecting means comprising a single reflective mirror; and said single reflective mirror being a movable mirror capable of having respective portions corresponding to said frequency components shift in said direction of optical signal propagation through deformation of the entire reflective surface thereof.

5. A variable dispersion compensator according to claim 4, characterized by said movable mirror, which is said single reflective mirror, being configured to allow the use of electrostatic force, which develops from application of voltage between a first electrode provided on said movable mirror and a second electrode provided at a predetermined position relative to said first electrode, to cause deformation of the entire reflective surface thereof.

6. A variable dispersion compensator according to claim 4, characterized in that said movable mirror, which is said single reflective mirror, is designed such that a drive portion provided in the vicinity of the center thereof is driven in said direction of optical signal propagation by driving means, so as to cause deformation of the entire reflective surface of the mirror.

7. A variable dispersion compensator according to claim 4, characterized in that said movable mirror, which is said single reflective mirror, is designed such that, while a fixed portion provided in the vicinity of the center thereof is fixed, drive portions provided respectively in the vicinity of the end portions on both sides thereof are driven in said direction of optical signal propagation by driving means, so as to cause deformation of the entire reflective surface of the mirror.

8. A variable dispersion compensator according to claim 4, characterized in that said movable mirror, which is said single reflective mirror, is designed such that a prescribed portion thereof is heated and displaced by heating means, so as to cause deformation of the entire reflective surface thereof.

9. A variable dispersion compensator according to claim 4, characterized by an array of reflective mirrors or a shape of the reflective surface, which configures said reflecting means, being approximately parabolic in relation to said frequency component to be reflected.

10. An optical transmission system comprising:

an optical transmission line, which propagates an optical signal having a frequency component within a predetermined frequency band; and a variable dispersion compensator, which applies a phase shift to an optical signal to compensate dispersion in said optical signal, characterized by comprising:

optical splitting means, which inputs an optical signal that is the subject of dispersion compensation, and splits said optical signal for every frequency component within a predetermined frequency band;

reflecting means, which reflects each of the respective said frequency components that are split by said optical splitting means, to apply a predetermined phase shift to each frequency component, and is configured with the reflection position for each of the respective said frequency components being movable in the direction of optical signal propagation; and optical combining means, which combines said frequency components reflected by said reflecting means to give a dispersion compensated optical signal, characterized by said reflecting means comprising a plurality of reflective mirrors that are divided corresponding to said frequency components; and each of the respective said plurality of reflective mirrors being a movable mirror capable of having the reflective surface thereof shifted separately in said direction of optical signal propagation, which variable dispersion compensator is disposed at a predetermined position upon said optical transmission line and compensates dispersion that develops in said optical signal propagated through said optical transmission line.

11. An optical transmission system according to claim 10, characterized by the bit rate of said optical signal being 10 Gbps or faster.

12. An optical transmission system comprising:

an optical transmission line, which propagates an optical signal having a frequency component within a predetermined frequency band; and a variable dispersion compensator, which applies a phase shift to an optical signal to compensate dispersion in said optical signal, characterized by comprising:

optical splitting means, which inputs an optical signal that is the subject of dispersion compensation, and splits said optical signal for every frequency component within a predetermined frequency band;

reflecting means, which reflects each of the respective said frequency components that are split by said optical splitting means, to apply a predetermined phase shift to each frequency component, and is configured with the reflection position for each of the respective said frequency components being movable in the direction of optical signal propagation; and optical combining means, which combines said frequency components reflected by said reflecting means to give a dispersion compensated optical signal, characterized by said reflecting means comprising a single reflective mirror; and said single reflective mirror being a movable mirror capable of having respective reflective portions corresponding to said frequency components shift in said direction of optical signal propagation through deformation of the entire reflective surface thereof, which variable dispersion compensator is disposed at a predetermined position upon said optical transmission line and compensates dispersion that develops in said optical signal propagated through said optical transmission line.

13. An optical transmission system according to claim 12, characterized by the bit rate of said optical signal being 10 Gbps or faster.

* * * * *